(12) United States Patent
Benitez et al.

(10) Patent No.: US 7,806,547 B2
(45) Date of Patent: Oct. 5, 2010

(54) BRIGHTNESS-ENHANCING FILM

(75) Inventors: Pablo Benitez, Madrid (ES); Juan Carlos Minano, Madrid (ES); Julio Chaves, Madrid (ES); William A. Parkyn, Lomita, CA (US); Oliver Dross, Cologne (DE); Roberto Alvarez, Glendale, CA (US); Waqidi Falicoff, Stevenson Ranch, CA (US)

(73) Assignee: Light Prescriptions Innovators, LLC, Altadena, CA (US)

( * ) Notice: Subject to any disclaimer, the term of this patent is extended or adjusted under 35 U.S.C. 154(b) by 0 days.

(21) Appl. No.: 12/353,939

(22) Filed: Jan. 14, 2009

(65) Prior Publication Data
US 2009/0180276 A1 Jul. 16, 2009

Related U.S. Application Data

(63) Continuation of application No. PCT/US2007/073530, filed on Jul. 13, 2007.

(60) Provisional application No. 60/807,476, filed on Jul. 14, 2006, provisional application No. 60/822,074, filed on Aug. 10, 2006.

(51) Int. Cl.
G09F 13/04 (2006.01)
G09F 13/08 (2006.01)
(52) U.S. Cl. .................... 362/97.3; 362/97.2; 362/331; 349/64; 359/619; 359/641
(58) Field of Classification Search ............ 362/97.1, 362/97.2, 97.4, 331, 339, 606, 617, 618, 362/619, 620; 359/580, 619, 641; 349/62, 349/64, 65
See application file for complete search history.

(56) References Cited

U.S. PATENT DOCUMENTS

| 2,254,961 A | 9/1941 | Harris |
| 2,908,197 A | 10/1959 | Wells et al. |
| 3,746,853 A | 7/1973 | Kosman et al. |
| 3,760,237 A | 9/1973 | Jaffe |
| 3,774,021 A | 11/1973 | Johnson |
| 3,938,177 A | 2/1976 | Hansen et al. |

(Continued)

FOREIGN PATENT DOCUMENTS

DE 2552278 5/1977

(Continued)

OTHER PUBLICATIONS

International Search Report, PCT/US03/38024, W004051223, mail date Nov. 10, 2004.

(Continued)

*Primary Examiner*—Stephen F Husar
(74) *Attorney, Agent, or Firm*—Thomas F. Lebens; Sinsheimer Juhnke Lebens & McIvor, LLP

(57) ABSTRACT

The present embodiments provide systems, backlights, films, apparatuses and methods of generating back lighting. Some embodiments provide backlights that include a cavity with at least one interior light source and diffusely reflecting wall of high reflectivity, a top surface with multiple intermittently spaced holes allowing exit of light generated by the light sources, and external collimators extending from each of the holes such that the external collimators spatially expand and angularly narrow the light exiting the holes.

16 Claims, 19 Drawing Sheets

U.S. PATENT DOCUMENTS

| | | |
|---|---|---|
| 4,114,592 A | 9/1978 | Winston |
| 4,188,111 A | 2/1980 | Marvin |
| 4,192,994 A | 3/1980 | Kastner |
| 4,211,955 A | 7/1980 | Ray |
| 4,337,759 A | 7/1982 | Popovich et al. |
| 4,342,908 A | 8/1982 | Henningsen et al. |
| 4,384,769 A | 5/1983 | Brei et al. |
| 4,638,343 A | 1/1987 | Althaus et al. |
| 4,675,725 A | 6/1987 | Parkyn |
| 4,698,730 A | 10/1987 | Sakai et al. |
| 4,709,312 A | 11/1987 | Heinisch et al. |
| 4,727,289 A | 2/1988 | Uchida |
| 4,727,457 A | 2/1988 | Thillays |
| 4,868,723 A | 9/1989 | Kobayashi |
| 4,920,404 A | 4/1990 | Shrimali et al. |
| 5,005,108 A | 4/1991 | Pristash et al. |
| 5,055,892 A | 10/1991 | Gardner et al. |
| 5,140,220 A | 8/1992 | Hasegawa |
| 5,302,778 A | 4/1994 | Maurinus |
| 5,335,157 A | 8/1994 | Lyons |
| 5,343,330 A | 8/1994 | Hoffman et al. |
| 5,404,282 A | 4/1995 | Klinke et al. |
| 5,404,869 A | 4/1995 | Parkyn, Jr. et al. |
| 5,434,754 A | 7/1995 | Li et al. |
| 5,438,453 A | 8/1995 | Kuga |
| 5,452,190 A | 9/1995 | Priesemuth |
| 5,453,877 A | 9/1995 | Gerbe et al. |
| 5,471,371 A | 11/1995 | Koppolu et al. |
| 5,528,474 A | 6/1996 | Roney et al. |
| 5,557,471 A | 9/1996 | Fernandez |
| 5,577,492 A | 11/1996 | Parkyn et al. |
| 5,580,142 A | 12/1996 | Kurematsu et al. |
| 5,600,487 A | 2/1997 | Kiyomoto et al. |
| 5,608,290 A | 3/1997 | Hutchisson et al. |
| 5,613,769 A | 3/1997 | Parkyn et al. |
| 5,655,830 A | 8/1997 | Ruskouski |
| 5,655,832 A | 8/1997 | Pelka et al. |
| 5,676,453 A | 10/1997 | Parkyn, Jr. et al. |
| 5,699,186 A | 12/1997 | Richard |
| 5,757,557 A | 5/1998 | Medvedev |
| 5,777,433 A | 7/1998 | Lester et al. |
| 5,806,955 A | 9/1998 | Parkyn, Jr. et al. |
| 5,813,743 A | 9/1998 | Naka |
| 5,839,812 A | 11/1998 | Ge et al. |
| 5,865,529 A | 2/1999 | Yan |
| 5,894,195 A | 4/1999 | McDermott |
| 5,894,196 A | 4/1999 | McDermott |
| 5,897,201 A | 4/1999 | Simon |
| 5,898,267 A | 4/1999 | McDermott |
| 5,898,809 A | 4/1999 | Taboada et al. |
| 5,924,788 A | 7/1999 | Parkyn |
| 5,926,320 A | 7/1999 | Parkyn et al. |
| 5,966,250 A | 10/1999 | Shimizu |
| 6,019,493 A | 2/2000 | Kuo et al. |
| 6,030,099 A | 2/2000 | McDermott |
| 6,044,196 A | 3/2000 | Winston et al. |
| 6,048,083 A | 4/2000 | McDermott |
| 6,055,108 A | 4/2000 | Dreyer |
| 6,097,549 A | 8/2000 | Jenkins et al. |
| 6,139,166 A | 10/2000 | Marshall et al. |
| 6,166,860 A | 12/2000 | Medvedev et al. |
| 6,166,866 A | 12/2000 | Kimura et al. |
| 6,177,761 B1 | 1/2001 | Pelka et al. |
| 6,181,476 B1 | 1/2001 | Medvedev |
| 6,201,229 B1 | 3/2001 | Tawa et al. |
| 6,222,623 B1 | 4/2001 | Wetherell |
| 6,252,636 B1 | 6/2001 | Bartlett |
| 6,268,963 B1 | 7/2001 | Akiyama |
| 6,273,596 B1 | 8/2001 | Parkyn |
| 6,282,821 B1 | 9/2001 | Freier |
| 6,296,376 B1 | 10/2001 | Kondo et al. |
| 6,301,064 B1 | 10/2001 | Araki et al. |
| 6,350,041 B1 | 2/2002 | Tarsa et al. |
| 6,356,700 B1 | 3/2002 | Strobel |
| 6,361,190 B1 | 3/2002 | McDermott |
| 6,450,661 B1 | 9/2002 | Okumura |
| 6,473,554 B1 | 10/2002 | Pelka et al. |
| 6,483,976 B2 | 11/2002 | Shie et al. |
| 6,488,392 B1 | 12/2002 | Lu |
| 6,502,964 B1 | 1/2003 | Simon |
| 6,504,301 B1 | 1/2003 | Lowery |
| 6,547,400 B1 | 4/2003 | Yokoyama |
| 6,547,423 B2 | 4/2003 | Marshall et al. |
| 6,560,038 B1 | 5/2003 | Parkyn et al. |
| 6,578,989 B2 | 6/2003 | Osumi et al. |
| 6,582,103 B1 | 6/2003 | Popovich et al. |
| 6,598,998 B2 | 7/2003 | West et al. |
| 6,603,243 B2 | 8/2003 | Parkyn et al. |
| 6,607,286 B2 | 8/2003 | West et al. |
| 6,616,287 B2 | 9/2003 | Sekita et al. |
| 6,621,222 B1 | 9/2003 | Hong |
| 6,637,924 B2 | 10/2003 | Pelka et al. |
| 6,639,733 B2 | 10/2003 | Minano et al. |
| 6,641,287 B2 | 11/2003 | Suehiro |
| 6,646,813 B2 | 11/2003 | Falicoff |
| 6,647,199 B1 | 11/2003 | Pelka et al. |
| 6,649,939 B1 | 11/2003 | Wirth |
| 6,674,096 B2 | 1/2004 | Sommers |
| 6,679,621 B2 | 1/2004 | West et al. |
| 6,688,758 B2 | 2/2004 | Thibault |
| 6,692,136 B2 | 2/2004 | Marshall et al. |
| 6,729,746 B2 | 5/2004 | Suehiro et al. |
| 6,744,196 B1 | 6/2004 | Jeon |
| 6,769,772 B2 | 8/2004 | Roddy et al. |
| 6,773,143 B2 | 8/2004 | Chang |
| 6,783,269 B2 | 8/2004 | Pashley |
| 6,803,607 B1 | 10/2004 | Chan et al. |
| 6,830,359 B2 | 12/2004 | Fleury |
| 6,863,402 B2 | 3/2005 | Roddy et al. |
| 6,882,379 B1 | 4/2005 | Yokoyama et al. |
| 6,886,962 B2 | 5/2005 | Suehiro |
| 6,896,381 B2 | 5/2005 | Benitez |
| 6,924,943 B2 | 8/2005 | Minano et al. |
| 6,926,435 B2 | 8/2005 | Li |
| 6,948,836 B2 | 9/2005 | Ishida et al. |
| 6,953,265 B2 | 10/2005 | Suehiro et al. |
| 6,967,779 B2 | 11/2005 | Fadel et al. |
| 6,988,813 B2 | 1/2006 | Hoelen et al. |
| 7,006,306 B2 | 2/2006 | Falicoff et al. |
| 7,021,797 B2 | 4/2006 | Minano |
| 7,042,655 B2 | 5/2006 | Sun |
| 7,144,121 B2 | 12/2006 | Minano et al. |
| 7,152,985 B2 | 12/2006 | Benitez et al. |
| 7,181,378 B2 | 2/2007 | Benitez et al. |
| 7,192,173 B2 | 3/2007 | Vaughnn |
| 7,262,912 B2 | 8/2007 | Wood |
| 7,347,599 B2 | 3/2008 | Minano et al. |
| 7,377,671 B2 | 5/2008 | Minano et al. |
| 7,425,407 B1 | 9/2008 | Wood et al. |
| 7,460,985 B2 | 12/2008 | Benitez et al. |
| 7,502,169 B2 | 3/2009 | Wood |
| 7,520,641 B2 | 4/2009 | Minano et al. |
| 2002/0034012 A1 | 3/2002 | Santoro et al. |
| 2002/0080623 A1 | 6/2002 | Pashley |
| 2002/0163808 A1 | 11/2002 | West et al. |
| 2002/0185651 A1 | 12/2002 | Sommers |
| 2003/0002281 A1 | 1/2003 | Suehiro |
| 2003/0076034 A1 | 4/2003 | Marshall |
| 2003/0147232 A1 | 8/2003 | Kraft |
| 2004/0062040 A1 | 4/2004 | Blume et al. |
| 2004/0080938 A1 | 4/2004 | Holman |
| 2004/0130907 A1 | 7/2004 | Albou |
| 2004/0145910 A1 | 7/2004 | Lisowski |
| 2004/0190304 A1 | 9/2004 | Sugimoto et al. |

| | | | |
|---|---|---|---|
| 2004/0218390 A1 | 11/2004 | Holman et al. | |
| 2004/0228131 A1 | 11/2004 | Minano et al. | |
| 2004/0246697 A1 | 12/2004 | Yamashita et al. | |
| 2005/0024744 A1 | 2/2005 | Falicoff | |
| 2005/0086032 A1 | 4/2005 | Benitez et al. | |
| 2005/0088758 A1 | 4/2005 | Minano et al. | |
| 2005/0117172 A1 | 6/2005 | Plamann et al. | |
| 2005/0129358 A1 | 6/2005 | Minano et al. | |
| 2005/0135095 A1 | 6/2005 | Geissler | |
| 2005/0169002 A1 | 8/2005 | Steen et al. | |
| 2005/0180145 A1 | 8/2005 | Okuwaki | |
| 2005/0200812 A1 | 9/2005 | Sakata et al. | |
| 2005/0219464 A1 | 10/2005 | Yamasaki et al. | |
| 2005/0225988 A1 | 10/2005 | Chaves | |
| 2005/0243570 A1 | 11/2005 | Chaves et al. | |
| 2006/0067078 A1 | 3/2006 | Beeson et al. | |
| 2007/0036512 A1 | 2/2007 | Winston et al. | |
| 2009/0180276 A1* | 7/2009 | Benitez et al. | 362/97.4 |

FOREIGN PATENT DOCUMENTS

| | | |
|---|---|---|
| EP | 0450560 A2 | 10/1991 |
| EP | 0962694 | 12/1999 |
| EP | 1434277 | 6/2004 |
| ES | 2142752 | 12/2000 |
| RU | 1282051 A1 | 1/1987 |
| WO | WO-9913266 | 3/1999 |
| WO | WO-99/15826 | 4/1999 |
| WO | WO-0107528 A1 | 2/2001 |
| WO | WO-01/35128 | 5/2001 |
| WO | WO-03/071352 | 8/2003 |
| WO | WO-03066374 A2 | 8/2003 |
| WO | WO-03066374 A3 | 8/2003 |
| WO | WO2007/104028 | 9/2007 |

OTHER PUBLICATIONS

International Search Report, PCT/US04/16313, WO04104925, mail date Mar. 21, 2005.
International Search Report, PCT/US04/24450, WO05012952, mail date Aug. 3, 2005.
International Search Report, PCT/US04/38584, WO2005050710, mail date Jul. 18, 2005.
International Search Report, PCT/US03/38024, WO2004051321, mail date Nov. 10, 2004.
International Search Report, PCT/US04/14938, WO04104642, mail date Mar. 1, 2005.
Office Action from 10622874 dated Jun. 3, 2004.
Office action from 10461557 dated Nov. 24, 2004.
Office action from 10726130 dated Jan. 17, 2006.
Office action from 10726130 dated Mar. 24, 2005.
Office action from 10269479 dated Mar. 29, 2004.
Notice of Allowance from 10269479 dated Mar. 29, 2004.
Notice of Allowance from 10622874 dated Jan. 4, 2005.
Notice of Allowance from 10461557 dated Aug. 8, 2005.
Notice of Allowance from 10726130 dated Sep. 7, 2005.
Office Action from 10772088 dated Apr. 24, 2007.
Interview Summary from 10772088 dated Apr. 5, 2007.
Advisory Action from 10772088 dated Dec. 6, 2006.
Office Action from 10772088 dated Sep. 8, 2006.
Office Action from 10772088 dated Feb. 24, 2006.
Office Action from 10772088 dated Dec. 16, 2005.
Notice of Allowance from 10779259 dated Oct. 10, 2006.
Office action from 10779259 dated Feb. 24, 2006.
Office action from 10779259 dated Oct. 6, 2005.
Notice of Allowance from 10816228 dated Sep. 14, 2007.
Office action from 10816228 dated Jun. 12, 2007.
Office action from 10816228 dated Apr. 5, 2007.
Office action from 10816228 dated Dec. 13, 2006.
Notice of Allowance from 10903925 dated Aug. 5, 2005.
Office action from 10903925 dated Jan. 25, 2005.
Office action from 10901919 dated May 8, 2007.
Notice of Allowance from 10880386 dated Jul. 14, 2006.
Office action from 10880386 dated Feb. 28, 2006.
Notice of Allowance from 10880386 dated Mar. 1, 2005.
Notice of Allowance from 10987182 dated Apr. 25, 2006.
Office action from 10987182 dated Nov. 3, 2005.
Office action from 10987182 dated Jun. 3, 2005.
Notice of Allowance from 11040506 dated Sep. 20, 2007.
Office action from 11040506 dated Apr. 9, 2007.
Interview Summary from 10269479 dated Mar. 18, 2004.
Office Action from 10772088 dated Sep. 27, 2007.
Office Action from 10816228 dated Mar. 31, 2006.
International Search Report and Written Opinion, PCT/US04/24330, mail date Jun. 27, 2006.
Office Action from 10901919 dated Oct. 19, 2007.
International Search Report, PCT/US2004/003054, WO2004070433A3, mail date Aug. 19, 2004.
International Preliminary Report on Patentability, PCTUS0438584, mail date Aug. 21, 2006, 1-4.
International Search Report and Written Opinion, PCT/US2004/38162, mail date Nov. 30, 2005.
International Search Report, PCT/US03/32076, WO2004034100, mail date Apr. 20, 2004.
Office Action from 10851471 dated Mar. 27, 2006.
Office Action from 10461557 dated Feb. 10, 2005.
Interview Summary from 10461557 dated Aug. 5, 2005.
Notice of Allowability from 10461557 dated Jan. 10, 2006.
PCT International Search Report and Written Opinion of the International Searching Authority from PCTUS0763522 dated Jan. 30, 2008.
International Preliminary Report on Patentability for PCT/US2006/029671 mail date Feb. 21, 2007.
International Search Report and Written Opinion of the International Searching Authority for PCT/US07/073530 mailed Mar. 7, 2008.
International Search Report and Written Opinion of the International Searching Authority for PCT/US07/75780 mailed Mar. 27, 2008.
Notice of Allowance for 12119039 mailed Dec. 19, 2008.
"Hyper ARGUS LED, Hyper-Bright 3mm LED, Non Diffused", *Infineon Technologies* Mar. 1, 2000, 1-9.
Benitez, P., "Chapter 6: The SMS Design Method in Three Dimensions", *Conceptos avanzados de optica anidolica: diseno y fabricacion*, PhD dissertation, UPM (1998).
Benitez, P., "Design in 3D Geometry with the Simultaneous Multiple Surface design method of Nonimaging Optics",*Instituto de Engergia Solar, E.T.S.I Telecommunicacion, Universidad Politecnica*, 28040. Madrid, spin Jul. 26, 2004.
European Search Report, Supplementary European Search Report from EP04752067 mailed May 9, 2008.
Eurpean Patent Office, European Search Report dated May 19, 2008 (replacement of May 9, 2008 Search Report).
Eurpoean Patent Office, Examination Report for EP Application No. 04750671 mailed Aug. 28, 2008.
Falicoff, Waqidi, "10903925".
Glaeser, Georg, "Reflections on Refraction",*AMS* Sep. 5, 2001, 1-18.
Int'l Searching Authority, International Search Report and Written Opinion of the International Searching Authority for PCTUS0629464 mailed Jun. 19, 2008.
Int'l Searching Authority, International Search Report and Written Opinion of the International Searching Authority for PCTUS0775779 mailed Jul. 24 2008.
Parkyn, "The Black Hole: Cuspated waveguide-injectors and illuminators for LEDs", *Part of the SPIE Conference on Nonimaging Optics: Maximum Efficiency Light Transfer V*, Denver CO Jul. 1999.
Remillard, et al., "Loss Mechanisms Optical Light Pipes", *Applied Optics*, vol. 31 #34 Dec. 1992 , 7232-7241.
Spigulis, "Compact Dielectric reflective elements, Half Sphere concentrators of radially emitted light", *Applied Optics* vol. 33 Nov. 25, 1994.
Notice of Allowance for 10901919 mailed Jun. 16, 2008.
Examiner Interview for 10901919 mailed Jan. 23, 2008.
Winston, Roland et al., "Nonimaging Optics", *Elsevier Academic Press*, Burlington, MA, USA, Copyright 2005.
Di Feng, "High quality light guide plates that can control the illumination angle based on microprism structures", *Applied Physics Letters*, 85 2004 , 6016-6018.

Di Feng, "Novel light-guide plate for liquid crystal display backlight", *J. Opt. A: Pure Appl. Opt.*, 7 2005, 111-117.

Kalantar, S., "Functional light-guide plate characterized by optical microdeflector and micro-reflectro for LCD backlight", *IEICE Trans. Electron.*, E84-C 2001, 1637-1646.

First Office Action from the Patent Office of the State Intellectual Property Office of the People's Republic of China for Application No. 200680027033.9 dispatched Mar. 13, 2009.

"BVT-LCD-RAC Product Datasheet", Bright View Technologies Unibright Film, http://brightviewtechnologies.com/downloads/LCD-RAC%20Data%20Sheet.pdf, Aug. 13, 2008, pp. 2.

Chaves et al, "Optical Device for LED-Based Lamp", U.S. Appl. No. 10/814,598, filed Mar. 30, 2004.

Parkyn, William A., "Method and Apparatus for Use in Injecting Light Into an Optical System", U.S. Appl. No. 10/851,471, filed May 21, 2004.

USPTO, *Non-Final Office Action from U.S. Appl. No. 12/368,991 mailed Jun. 25, 2010*, 9 pages.

European Patent Office, *Supplementary European Search Report for App. No. 06800531 completed Apr. 13, 2010*, 10 pages.

\* cited by examiner

BRIGHTNESS-ENHANCING FILM

PRIORITY CLAIM

This application is a continuation of PCT/US07/73530, filed Jul. 13, 2007, entitled BRIGHTNESS-ENHANCING FILM, which claims the benefit of U.S. Provisional Application No. 60/807,476, filed Jul. 14, 2006, entitled BRIGHTNESS-ENHANCING FILM; and claims the benefit of U.S. Provisional Application No. 60/822,074, filed Aug. 10, 2006, entitled BRIGHTNESS-ENHANCING FILM, all of which are incorporated herein by reference in their entireties.

FIELD OF THE INVENTION

The present invention relates generally to the recirculation of light, and more particularly brightness films.

BACKGROUND

Brightness-enhancement films have been used for many applications. For example, brightness-enhancement films can be utilized with LCD backlights and other applications. Backlights are commercially available in a great variety of configurations, ranging from relatively large bulky units with fluorescent lamps to relatively small LCD backlights.

Brightness-enhancing films of some prior systems operate commercially in conjunction with the white-painted interior of a backlight. Because they operate by retroreflection, they will be referred to as RBEFs. RBEFs function to increase the brightness of an open top of a backlight. Often however, these RBEFs produce non-uniform intensity patterns. Further, many of these systems have relatively low output efficiency.

SUMMARY OF THE EMBODIMENTS

The present embodiments provide systems, backlights, films, apparatuses and methods of generating back lighting. Some embodiments provide backlights that include a cavity with at least one interior light source and diffusely reflecting wall of high reflectivity; a top surface with multiple intermittently spaced holes allowing exit of light generated by said light sources; and external collimators extending from each of said holes such that the external collimators spatially expand and angularly narrow said light exiting said holes.

Some embodiments provide thin films. These films comprise a transparent dielectric material bonded to a highly reflective opaque thin film with multiple intermittently spaced holes configured to allow hemispheric light to pass through the holes and to enter said transparent dielectric material, such that said light thereby becoming confined to within a critical angle of said transparent dielectric material; and each of said holes being registered with a lenslet formed on an upper surface of said transparent dielectric material, each said lenslet being configured as an external collimator that receives a portion of the light from said transparent dielectric material and spatially expands and angularly narrows said light confined to said critical angle.

Further embodiments provide brightness enhancement thin films. These embodiments comprise an opaque diffuse reflective thin film with an array of holes, an overlaying transparent layer of low-index material comprising conicoidal voids with the conicoidal voids being positioned over said holes of said diffuse reflective thin film, and a layer of high-index material filling said conicoidal voids such that an array of dielectric internally reflecting concentrators is formed thereby.

Further embodiments provide brightness enhancement thin film that include an opaque diffuse reflective thin film with an array of slits, an overlaying transparent layer of low-index material comprising linear troughs with the linear troughs being positioned over said slits in said diffuse reflective thin film, and a layer of high-index material filling said linear troughs such that an array of dielectric internally reflecting concentrators is formed thereby.

Brightness enhancement thin film according to some embodiments comprise an opaque layer of low-index of refraction material having high optical reflectance, with conicoidal voids with an array of holes, said opaque layer having a bottom surface that is textured and whose remaining surfaces are smooth, and a layer of high-index of refraction material filling said conicoidal voids such that an array of dielectric internally reflecting concentrators is formed thereby.

Other embodiments provide brightness enhancement thin films. These films include an opaque layer of high optical reflectance, with partially spherical voids with an array of holes, said opaque layer having a bottom surface that is textured and whose remaining surfaces are smooth, and a top layer comprising spherical lenses filling said partially spherical voids such that an array of lenses is formed thereby.

Some additional embodiments include brightness enhancement films. These files include a first film comprising a first solid of dielectric with a first reflective layer on a first surface of the solid of dielectric where the reflective layer defines a first array of holes, and the first solid dielectric further comprising a first array of one-directional lenses defining a second surface of the first solid of dielectric opposite the first surface and each of the first array of holes are aligned with one of the first one-directional lenses; and a second film comprising a second solid of dielectric with a second reflective layer on a first surface of the solid of dielectric where the second reflective layer defines a second array of holes, and the second solid dielectric further comprising a second array of one-directional lenses defining a second surface of the second solid of dielectric opposite the first surface of the second solid dielectric and each of the second array of holes are aligned with one of the second one-directional lenses, with the first surface of the second film adjacent the second surface of the first film and the second film is oriented such that the second array of one-directional lenses is orthoginal to the first array of one-directional lenses.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular descriptions presented in conjunction with the following drawings, wherein:

FIG. 2b depicts a graphical representation of a mathematical diagram of the recirculation of light within the backlight of FIG. 2a.

FIG. 17b is a rear view of the CPC array of FIG. 17a.

FIG. 22b is a perspective view from above of the film of FIG. 22a.

Corresponding reference characters indicate corresponding components throughout the several views of the drawings.

Figure 1A:
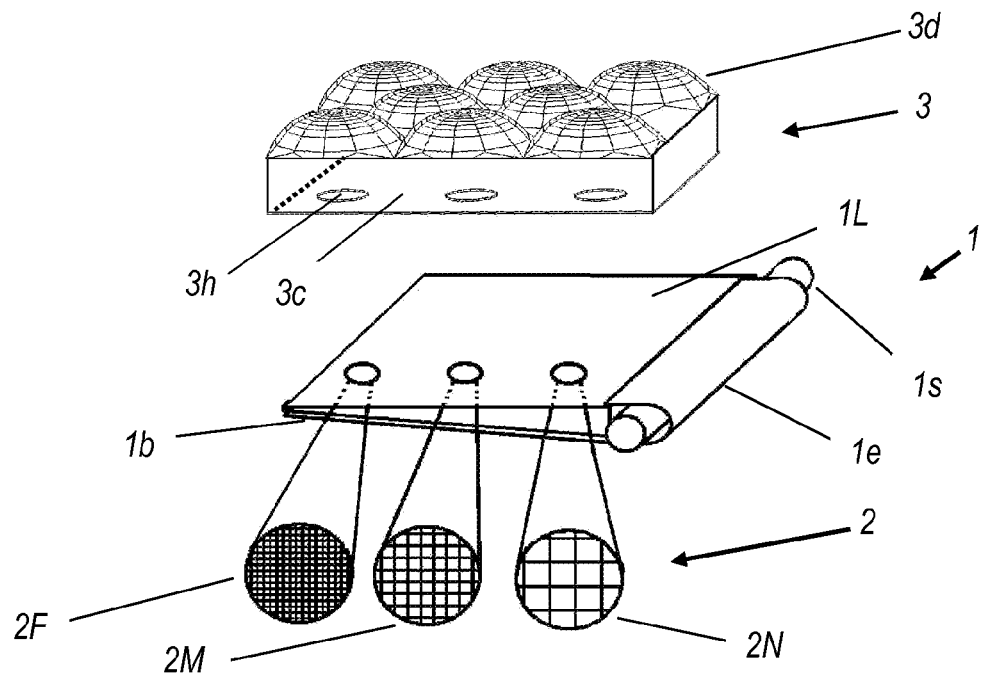
FIG. 1A shows a perspective view of a backlight.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Brightness-enhancing films of some previous systems operate commercially in conjunction with the white-painted interior of a backlight. Because they operate by retroreflection, they will be referred to as RBEFs to distinguish them from the present embodiments. RBEFs function to increase the brightness of the open top of a backlight. The typical RBEF configuration comprises one or two microstructured prismatic films, ridges outwards, which retroreflect on-axis rays but transmits the very oblique light by deflecting it into the output beam. Since the very oblique impinging light is needed, backlights typically need a diffuser under the RBEF to guarantee it. The relatively narrow (approx. ±25°) output means that more light is recirculated at each pass than is transmitted. An efficient backlight acts to diffuse this recirculated light laterally and sending back upwards, thereby overlaying it onto the first-pass output, thereby increasing output brightness. This widely adopted approach does have problems, however. Besides still requiring a separate diffuser below the RBEF, a single array of microprisms only delivers its angular compression transversely, so that two crossed films are necessary for complete enhancement, adding to design complexity and cost. Their output intensity is not uniform within the main lobe, nor is it non-zero outside it. Significant energy is lost in an ineradicable sidelobe at 60° off-axis. It is typically not possible to engineer a different angular width of output than that of RBEF, which is customarily described as ±26° but is only a vague boundary.

The non-uniformity of the RBEF intensity pattern implies that in the lower intensity directions the prism appear partially dark, which increases the amplitude of the Moire effects.

Even more disadvantageous, however, is the relatively low output efficiency of RBEFs. Theoretical ray traces of RBEFs with totally sharp corners and totally non-scattering material show that only about 30% of the original luminosity of the sources in the backlight ends up within the restricted angular range of ±20° of RBEF output. While theoretical ray-traces can show a tripling of brightness, actual performance shows a doubling at best, due to scattering in the device, and especially from the inevitable rounding of the edges of the microprisms from the manufacturing process. Combined with the inability to alter RBEF output-angle, this inefficiency is doubly disadvantageous.

A single part and more effective novel approach is disclosed by the example embodiments. Some embodiments are herein referred to as a lenticular brightness enhancing film (LBEF). This is a single film with superior efficiency and much greater brightness enhancement, due at least in part to the restriction of its angular output to a designated angular range, with good cutoff at any value from about ±10° all the way to the ±90° of full Lambertian emission, if so desired, unlike the fixed 26° value of RBEF. Emission is very low everywhere outside the main lobe, unlike RBEF's diffuse background leakage.

In U.S. Pat. No. 6,869,206 by Zimmerman, one or more LED's are placed in a white or reflective box with a single opening smaller than the sum of the LEDs' emission areas. The approach described in Zimmerman purports to be able increase the luminance of the LED sources. This is accomplished, however, by reducing the area of the flashed aperture of the device, and as such would be unsuitable for use in backlights, where typically the flashed area is considerably larger than the source or sources, especially if they are LEDs.

The present embodiments relate generally to the recirculation and angular narrowing of the output of a generally hemispherically emitting light source, whether a backlight or an LED itself, and more particularly to the replacement of retroreflection brightness-enhancing files (RBEF) in LCD backlights by a superior performance brightness-enhancing films (BEF).

Some embodiments use a highly reflective (diffuse or specular) surface featuring an array of transmissive apertures, atop each of which is a collimator producing the desired restriction of angular output. This novel approach replaces a conventional two-film RBEF with a single thin film comprising the two bonded components of holed white reflector and collimator array. Compared to the conventional two-film RBEF, the present embodiments produce a greater brightness enhancement and efficiency, a more uniform intensity and reduced Moire effect, and permits the elimination of the diffuser that presently is needed under the RBEFs.

As described above, backlights are commercially available in a great variety of configurations, ranging from large bulky units with fluorescent lamps to tiny LCD backlights. The most common type has diffusely reflective (i.e., white-painted) interior surfaces with light sources shining on them. A widely adopted arrangement has been modified in accordance with the principles of the present embodiments. FIG. 1a shows backlight 1, comprising tubular light source 1s, edge reflector 1e bordering source 1s on the outside, diffuse bottom reflector 1b, and wedge-shaped light guide 1L. Shown as patterned circles 2 are close-up views of light-extraction microdots, positioned by the thousands on the bottom surface of light guide 1L. They scatter the incident light within 1L, both upward into air and downward to bottom reflector 1b. Near light source 1s, lightly diffusing pattern 2N has greater flux to work with. Halfway out, medium-strength diffusing pattern 2M has half the initial flux to work with. Near the edge, heavily diffusing pattern 2F scatters nearly all flux incident upon it. The tuned diffusion of circles 2 gives uniform brightness. The white bottom coating 3c, along with backlight bottom surface 1b, recirculates light more efficiently than do RBEFs.

In FIG. 1a, the sole separate component mounted atop backlight 1 is transparent dielectric thin film 3, shown magnified to match the scale of circles 2. On the bottom surface of thin film 3 is permanently bonded a thinner, yet opaque diffusely reflecting bottom coating 3c, with holes 3h. On the top surface of transparent film 3 are formed, by embossing or some other manufacturing process, domed micro-lenses 3d, centered above holes 3h, and acting to make the same function as conventional brightness enhancing films, but with substantially no side lobes, resulting in much greater brightness, efficiency and having sharper cutoff. Additionally, as there is a more uniform intensity distribution and reduced Moiré effect associated with this approach as compared to the RBEF system, this allows the diffuser to be eliminated, whereas it is indispensable for the RBEF system of the prior art.

Figure 1B:
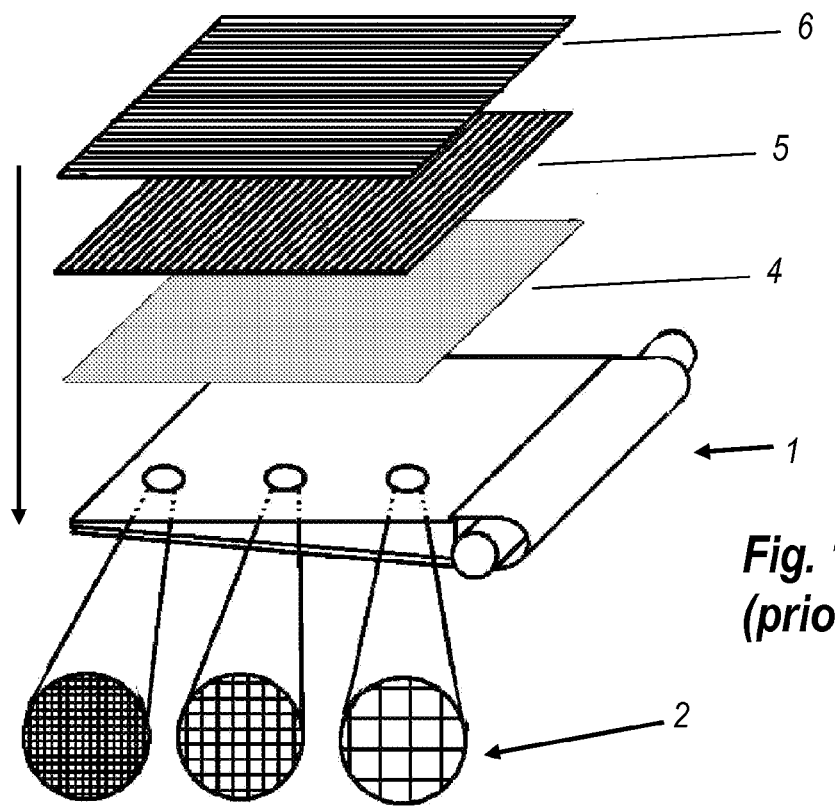
FIG. 1B shows an example of crossed brightness-enhancing films over the backlight of FIG. 1.

For reference, FIG. 1b shows identical backlight 1 and microdots 2, but utilizing a brightness enhancement employed in some prior systems, comprising overlying thin film diffuser 4, first linear-microprism layer 5, and second, orthogonally disposed, linear-microprism layer 6. These are shown separately in this exploded view but they typically lie directly in contact The configuration of FIG. 1b typically serves to double brightness inside a fixed angle of about ±26°, but at the relatively low efficiency within the angle of about 30%. Such low efficiency is a hindrance to notebook computers, whereas the embodiment as shown in FIG. 1a can be over 60% efficient, resulting in nearly quadrupled brightness, enabling notebook batteries to last nearly twice as long as with the prior art of brightness enhancement.

Next will be shown backlight designs differing from the conventional arrangement of FIG. 1a, which was shown first to emphasize the general applicability of some embodiments to a wide variety of backlights.

Figure 2A:
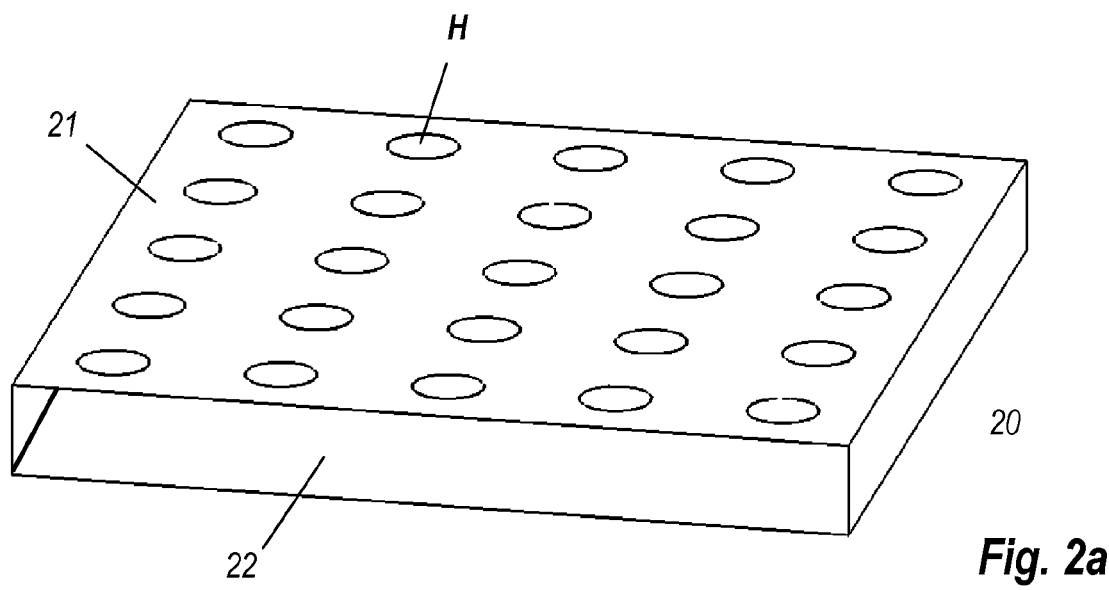
FIG. 2a depicts a perspective view of a backlight with an array of holes and interior light sources therebetween on the upper surface.

FIG. 2a shows backlight 20 and top surface 21 having an array of holes H, through which light passes from the bottom plane 22. The plane 21 is the exit aperture of the backlight (in actuality this an intermediary exit surface that feeds another optical element explained later in FIG. 5 thru FIG. 10). Behind it, there may be many elements, such as a light guide, back reflector, diffusers. For our purposes now, the only data needed is the global effective reflectance of surface 22 which takes into all the internal backlight components no matter their complexity. The high diffuse reflectance of surface 21 and backlight plane 22 enables recirculation and mixing of the light to take place and eventually to exit through holes H, typically after multiple bounces. The side walls of backlight 20 are shown and are typically reflective to prevent leakage although the relative size in real backlights is much smaller than is shown in FIG. 2a). FIG. 2a is equally valid to represent another backlight type, formed by a white enclosure in which the LEDs are placed inside (not shown). In this case, these LEDs can face downward towards bottom surface 22 and thereby illuminating it.

Figure 2B:
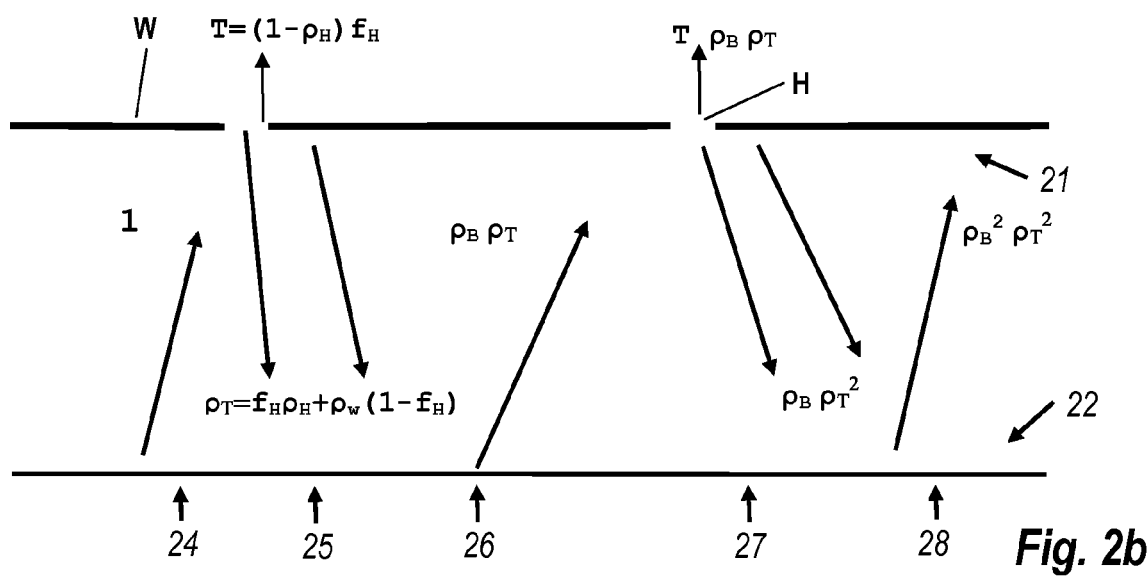

FIG. 2b shows the mathematical modeling of light recirculation within system 20 of FIG. 2a, utilizing the following symbols:

$\rho_w$=reflectivity of top surface 21 (can be either diffuse or specular)

$\rho_H$=reflectivity of the holes H $\rho_T$=effective reflectivity of the top surface 21

$\rho_B$=reflectivity of bottom surface 22 (typically a diffuse reflector but can also be specular)

T=transmission of the top surface.

$f_H$=fraction of upper surface occupied by holes.

If $d_H$ is the hole diameter (assumed constant in this analysis) and $S_H$ is the hole spacing, then, for instance, for rectangular arrays, $f_H = \pi d_H^2 / 4 S_H^2$ In FIG. 2a backlight 20 is thin, indicating that for the sake of analytical clarity edge-effects will not be considered. FIG. 2b shows successive stages in the recirculation within the backlight, comprising upper surface 21 and white lower surface 22. The long dashes W indicate the white reflective part of the upper surface, and the small gaps H indicate the holes through which light escapes. Process 24 is the initial upward emission from surface 22 of a short pulse of light with unit ('1.0') flux. Process 25 comprises the tripartite division of this upward flux, with $T=(1-\rho_H)f_H$ the resultant escaped flux, $f_H \rho_H$ the flux reflected downward by holes H, and $\rho_w(1-f_H)$ the flux reflected downward by reflected portion from surface W. The addition of these two downward components constitute the average top reflectivity $\rho_T = f_H \rho_H + \rho_w(1-f_H)$. Process 26 is the reflection of these two downward fluxes, giving the upward flux $\rho_B \rho_T$. Subsequent process 27 comprises the tripartite division of this flux into escaping flux $T\rho_B\rho_T$, downward two-component flux from H and W of $\rho_B\rho_T$. Process 28 is the subsequent upward reflection of these two component flux, expressed in gathered terms by $\rho_B^2\rho_T^2$.

FIG. 2b has served to show that the total escaped flux $F_{out}$ (that is, the efficiency, since the input was 1.0) is simply the sum of an infinite series of such fluxes:

$$F_{out} = T\left(1 + \sum_{i=1}^{\infty}(\rho_B\rho_T)^i\right)$$
$$= T/(1-\rho_B\rho_T).$$

Figure 3:
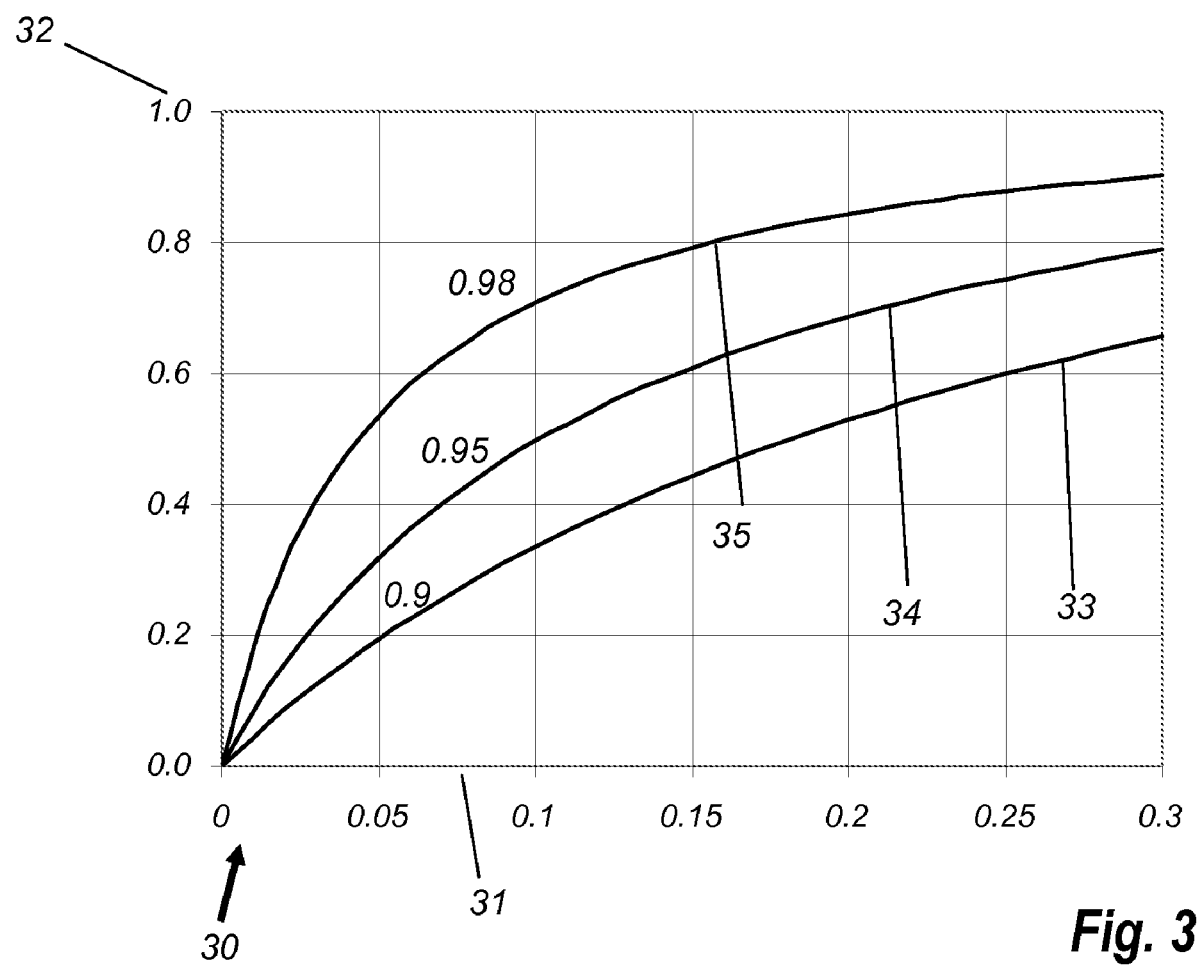
FIG. 3 is a graphical representation of luminous output as a function of relative hole-size and backlight reflectivity using the equations for theoretical model of FIG. 2b.

FIG. 3 shows graph 30 with horizontal scale 31 for hole fraction $f_H$ and vertical scale 32 for the luminous output $F_{out}$ of the holes of FIG. 1. All curves correspond to a hole reflectivity $\rho_H$=13% (which corresponds to some embodiments that will be shown below). Curve 33 is for, top reflectivity and bottom reflectivity $\rho_W=\rho_B$=90%, curve 34 for $\rho_W=\rho_B$=95%, and curve 35 for $\rho_W=\rho_B$=98%. While materials having the latter value are commercially available, they are typically rather expensive, and generally the 95% value is correct for injection-molded parts with titanium-dioxide pigment.

Figure 4:
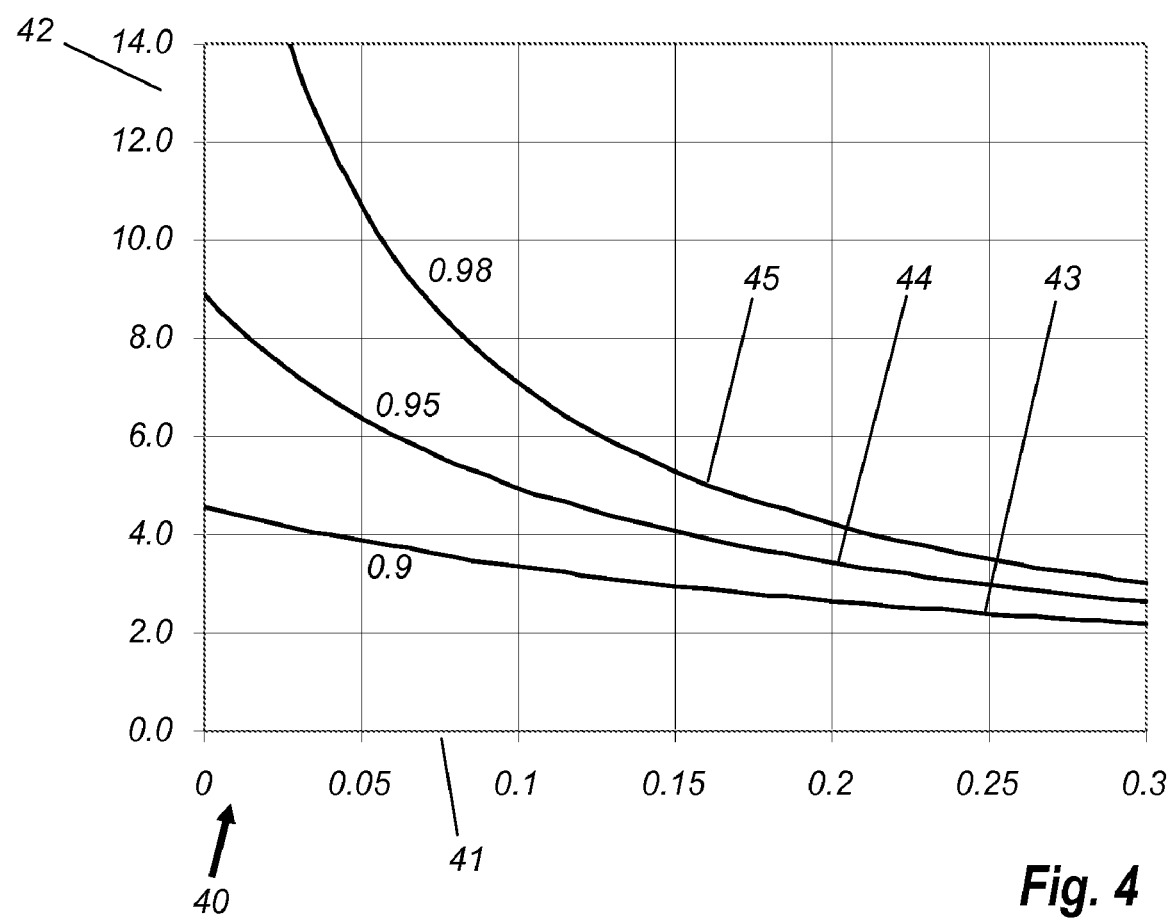
FIG. 4 is a graphical representation of the brightness enhancement as a function of relative hole-size and backlight reflectivity using the equations for theoretical model of FIG. 2b.

The reduced luminous output of the holes is emitted over their much small surface fraction $f_H$, resulting in their brightness being amplified, relative to the brightness of the backlight (calculated as that produced by surface 22 when surface 21 is removed), by the factor Brightness gain factor=$F_{out}/f_H$ FIG. 4 shows graph 40 with horizontal scale 41 representing the hole fraction $f_H$ and vertical scale 42 which is the brightness gain factor. Curve 43 is for wall reflectivity $\rho_W$=90%, curve 44 for 95%, and curve 45 for 98%.

In order for the brightness gain factors to be useful, the light transmitted through the holes, whose illuminance is spatially non-uniform due to the fact that that there is an opaque unlit surface surrounding the holes, is desirably transformed in some embodiments into a spatially uniform collimated light (typically without introducing additional scattering processes). In order to achieve this more elements are added to the system. In the sections that follow the theory relating to some embodiments will be addressed step by step, eventually culminating in the procedures for designing the actual optical components for an embodiment that meets the requirements for backlights. The next step in this disclosure will be to add a transparent cover to the backlight of FIG. 2a, which is explained next.

Figure 5:
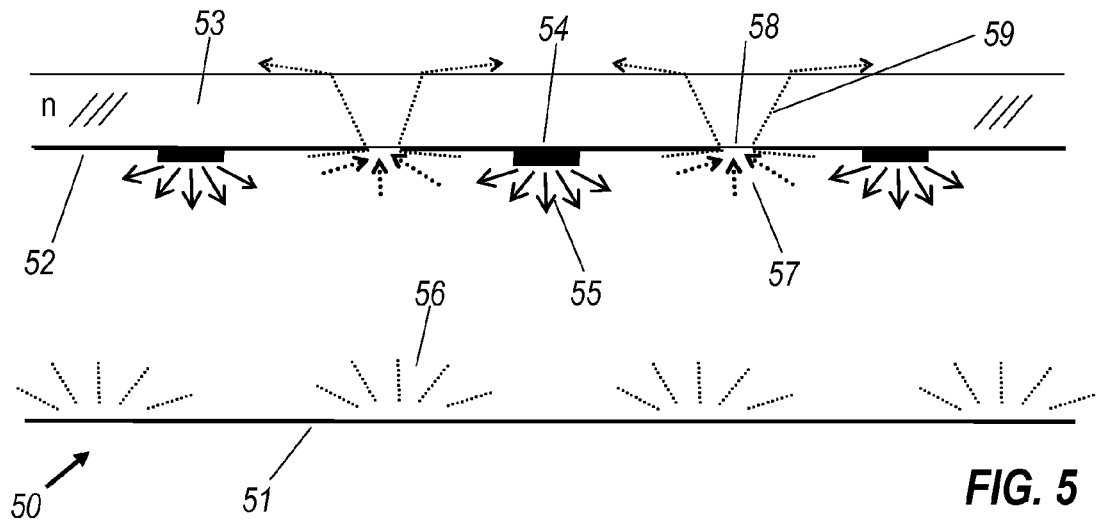
FIG. 5 is a cross-sectional diagram of a backlight with a transparent cover over a diffuse reflective cover with an array of holes admitting light into it.

FIG. 5 is a cross-sectional view of air-filled backlight 50, showing diffuse reflective bottom surface 51 and opaque diffuse reflective upper surface 52 with transparent dielectric window 53 over it, having refractive index n. LEDs 54 shine Lambertian outputs 55 downward, while diffuse mixed light 56 shines back upwards. Of this upward flux, hemispheric rays 57 enter aperture 58 and proceed into window 53. Extreme rays 59 are at the critical angle, $\theta_x=\sin^{-1}(1/n)\sim40°$, within window 53. This construction provides for the electronic traces for LEDs 54 to be on the upper side of upper surface 52, while the lower side of surface 52 has a diffuse reflective coating surrounding the LEDs.

The application of some embodiments is not restricted to any one type of backlight, such as that of FIG. 1a or ones based on the principle shown in FIG. 5. The one in FIG. 5 is disclosed herein to show the new possibilities created by some present embodiments, in that backlights of some prior systems often required totally transparent tops for light to come out of, so there is substantially no way to mount the LEDs thereupon. Although this generally is not used in display backlighting, where the hole pitch should be in the few hundred micron level or less, this approach is interesting for more general backlighting in illumination. While some prior systems use numerous strategies to keep the LEDs from shining directly out the top aperture, there is no such problem with this 'upside-down' mounting of the LEDs in between the holes, making it possible for different colored LEDs to be mounted for full chromatic mixing.

It is theoretically possible for hole-luminance to approach chip luminance in FIG. 5 and even exceed it somewhat, but such high brightness would include a configuration such that the total area of apertures 58 be smaller than LEDs' area 54.

In FIG. 5, the light exiting the top of window 53, though having the enhanced brightness of the holes, is useless for many applications because the holes are visible and light spreads out hemispherically, the same as the light entering the holes without the window cover. Some present embodiments therefore comprise an additional optical-collimation feature to the top surface of the window.

Further, some embodiments operate by collimating the rays 59 of FIG. 5, thereby reducing their angular width. If window 53 is sufficiently thick the rays 58 would expand until nearly overlapping. Hereinafter only these rays will be considered and their source is assumed to be a Lambertian just outside apertures 58.

The diffuse reflective coating corresponding to 52 of FIG. 5 operates on the microlevel through light-scattering by small transparent pieces of such high-refractive index material such as titanium dioxide (n~2.5). The actual surface of such a coating (typically white) will generally only reflect a portion of its 95 to 99% reflectivity, with deeper layers also scattering. A minimum thickness presumably is about tens of microns, with reflectivity being sacrificed for those that are too thin, leaving some light to be transmitted instead. Commercial products are also available in the form of spray paints or inks (including silk-screenable inks), which can be deposited onto a suitable substrate by a wide range of processes known to those skilled in this art. For example, a 99% reflective paint material is available from Edmund Optics of New Jersey called "Munsell White reflectance coating". The material is a composite of Barium Sulfate, binder and solvent. The minimum coating thickness to achieve a reflectance in the visible range above 99% is 0.64 mm. One example method of applying this material is by spray painting.

Beyond the minimum thickness for attaining high reflectivity already mentioned, there is a cost issue regarding the achievement of high reflectivity for the reflective surfaces within the backlight. Some current injection-molding technology utilize titanium-dioxide inclusions within the plastic material, typically yielding 95% reflectivity at relatively low cost. The 98% reflectivity attainable with pure titanium dioxide and 99% reflectivity with Barium Sulfate, however, are generally so much more expensive that it is typically reserved for such critical applications as integrating spheres for photometry. Accordingly, some present embodiments are to be emphasized which succeed with the backlight's interior reflectivity at a reasonable cost.

Besides the deposition techniques of screen printing, spraying and injection molding of high reflectance substrates, there are other methods of deposition and manufacturing with cost and accuracy advantages. One example method of deposition that has applicability to many of the present embodiments is the use of ink-jet technology. This approach has been used in many industries when it is desired to deposit one material onto another when attempting to satisfy very high tight alignment tolerances. Typically, when materials are applied using ink jets, the substrate is made of a completely different material than what is being deposited on it. This is very useful because the substrate material can be made of a transparent dielectric material (which can for example be the collimating element of the system), whereas the material deposited by ink jet can be the opaque reflective surface. The position and volume accuracy of this deposition process is typically extremely high, and it can also be carried out at a low cost in high-volume setups. It is used in a wide range of applications and industries, such as in the toy industry and has even been used for depositing phosphor onto the top and sides of LEDs.

Figure 6:
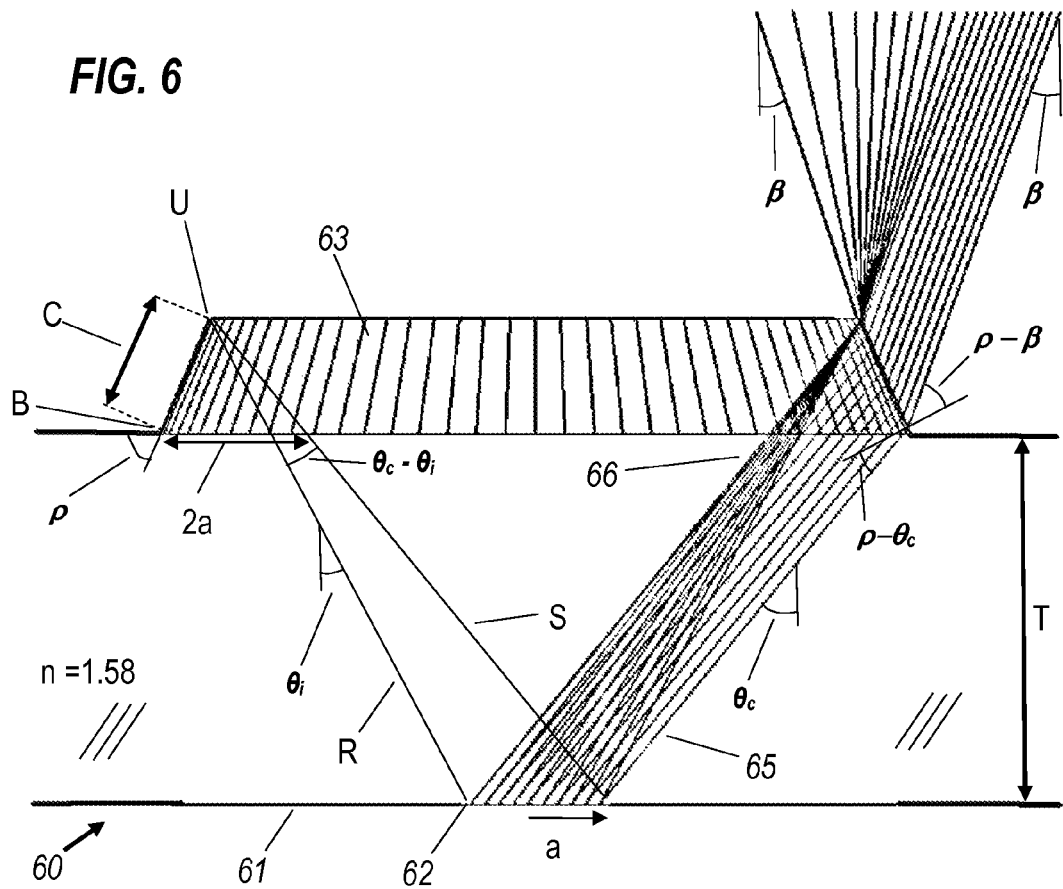
FIG. 6 shows a cone formed on said cover to refract edge rays into 20° rays.

FIG. 6 shows the first stage in the derivation of a collimator, upon the top surface of a window, restricting its luminous intensity to angle β off-axis. Transparent window 60 is shown here as having the index of refraction n=1.58 of polycarbonate, shown as exemplary due to polycarbonate's tolerance of ambient temperatures above 100° C. This does not in any way, however, restrict the generality of the present embodiments to this plastic, as materials having a wide range index of refraction can be utilized just as easily.

FIG. 6 shows dielectric window 60 having opaque-reflective diffuse bottom film 61 with hole 62, of radius a, which hemispherically admits light from within a backlight (not shown) lying further below (as in FIG. 2a). On the top side of window 60 is protuberance cone 63, slanted at angle ρ, having diagonal length C running from upper point U to bottom point B. This Figure serves to show the trigonometric derivation of the location and size of this cone, which serves as the outer portion of a complete lens of some embodiments, which will be derived below.

Nearly horizontal rays (not shown) onto hole 62 will refract through the bottom surface of window 60 of FIG. 6, thereafter bending inwards to the critical angle, for example, $\theta_c$=39.1°, to become bundle 65 of parallel edge rays, so-called because generally no rays have a steeper off-axis angle. Also shown is focusing ray-pencil 66 from just above hole 62, converging on the upper edge of cone 63. Rays R and S outline the same bundle on the left side. Cone 63 are sized and positioned to intercept bundle 65 of parallel rays, and its slant angle ρ is such as to refract them into the output angle β. That is, the interior angle ρ–$\theta_c$ is related by Snell's law to the exterior angle ρ–β:

$$\sin(\rho-\beta) = n \sin(\rho-\theta_c).$$

Utilizing the trigonometric formula for the sine of a difference of angles, and gathering terms, gives:

$$\tan\rho = (1-\sin\beta)/(n\cos\theta_c - \cos\beta),$$

which for n=1.58 gives ρ=66.7°. For β=30° it gives ρ=54.5°, and for β=45° it gives ρ=29.6°. This exemplifies the ability of at least some of the present embodiments to specify the output angle β, which is fixed at about 25° for RBEFs. Also, the method of FIG. 6 means that no light will be emitted outside β, quite unlike the considerable side lobe (e.g., at 60°) and scattering suffered by RBEFs.

The size of cone 63 is determined by its slant angle ρ and the critical angle $\theta_c$. The diagonal length C of its cross-section is given by the law of sines as:

$$C = 2a\cos\theta_c/\cos(\rho-\theta_c).$$

Ray R is at off-axis angle $\theta_i$, the value of which is determined by window thickness T, that is to say, how far along bundle 64 is cone 63 positioned. If it is so close that $\theta_i > \theta_c$, then the rightmost ray of pencil 65 cannot exit the lens. This happens to some extent in a smaller embodiment discussed below, but in FIG. 6 the interior angle ρ–$\theta_i$ instead refracts to the exterior angle ρ+β, giving:

$$\theta_i = \rho - \sin^{-1}[\sin(\rho+\beta)/n].$$

Then the length of ray R is given by the trigonometric law of sines applied to the triangle it forms with ray S and hole 62:

$$R = 2a\cos\theta_c/\sin(\theta_c - \theta_i)$$

Figure 8:
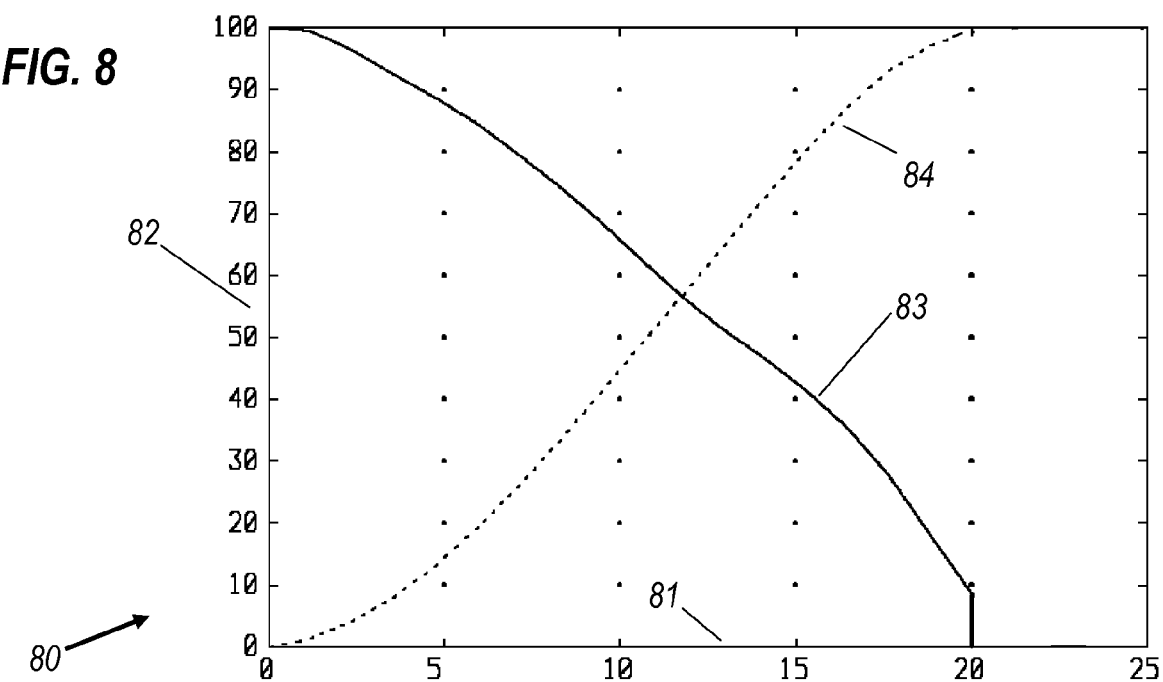
FIG. 8 shows the ±20° angular output of the lens of FIG. 7.

Utilizing a system with horizontal coordinate r and vertical coordinate z, with origin at the center of hole 62, the coordinates of the upper edge U of cone 63 are $r_u$=a+R sin $\theta_i$ and $z_u$=R cos $\theta_i$. For the bottom edge B, the coordinates are $r_b = r_u + C\cos\rho = 5.196$ and $z_b = z_u - C\sin\rho = T = 5.133$, assuming a=1. Note that this ratio of lens to hole corresponds to $\sin^{-1}(1/5.196) = 11.1°$, smaller than the 20° limiting angle of the design. That is to say, this system is not at the etendue limit. As a result, it will not produce a pill-box intensity pattern, as shown later (FIG. 8).

Figure 7:
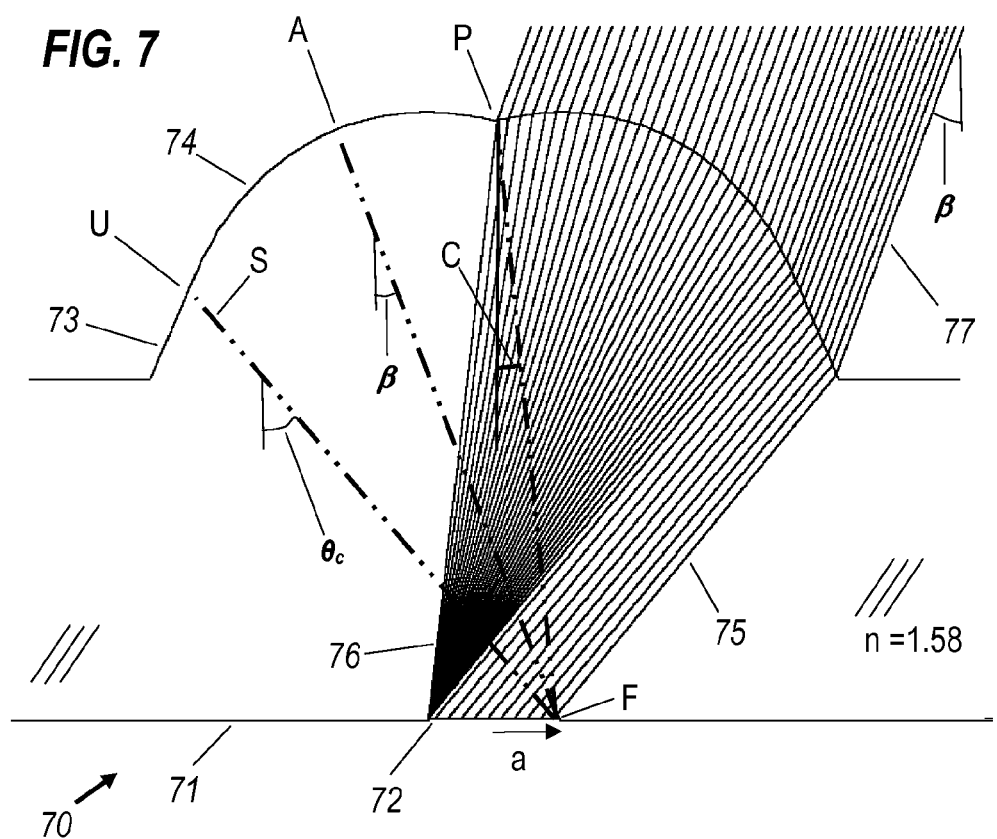
FIG. 7 shows the lens on the cone of FIG. 6.

The completion of a cone such as cone 63 of FIG. 6, by a surface extending from its upper edge U, is the subject of FIG. 7, showing window 70 with opaque diffuse reflective film 71 having hole 72 admitting light therein. As in FIG. 6, admitted light is confined to the critical angle $\theta_c$ of the lens material. FIG. 7 shows representative key components of that light, bundle 75 of parallel edge rays and pencil 76 originating from the left edge of hole 72, all of which are refracted into bundle 77 of parallel rays at the specified limiting output angle β.

Curved lens surface 74 is a solid of revolution with a profile comprising an arc UAP of an ellipse with focus at edge F of hole 72, and semimajor axis extending along dashed line FA, which is tilted off-axis at angle β. The collimation obtained by the use of an elliptical arc is free from spherical aberration, i.e., it is perfect for rays originating from the focal point (as explained on page 133 of 'Lens Design Fundamentals' by Rudolf Kingslake, Academic Press, 1978). This is used in some embodiments to define a good cut-off edge in the far field.

Figure 13:
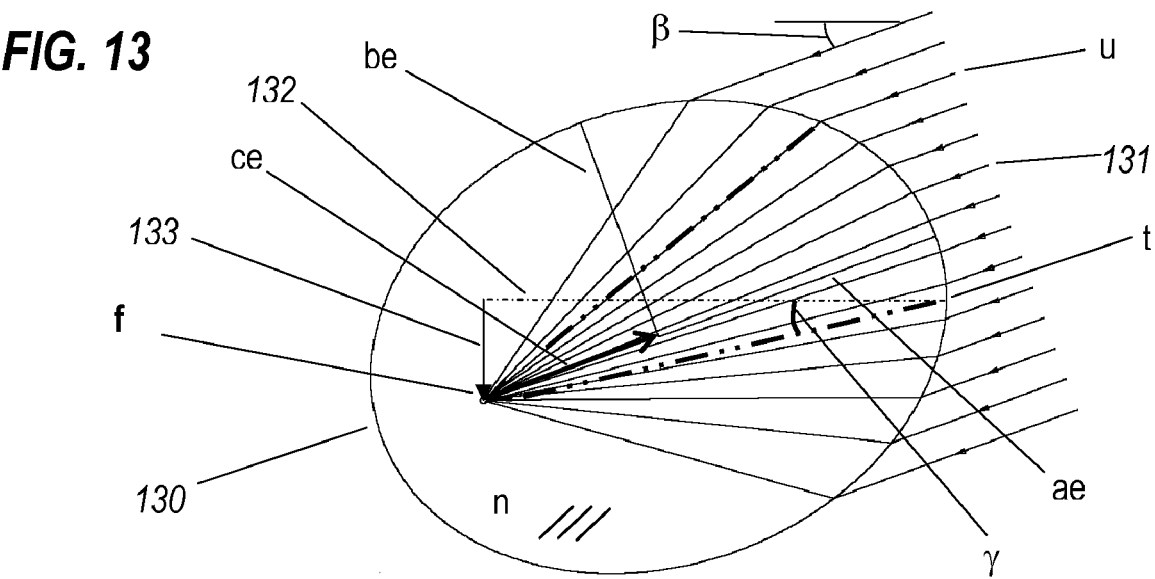
FIG. 13 depicts a graphical representation of general principles of elliptical focusing.

FIG. 13 shows the general principle of elliptical focusing for a material with an index of refraction n of 1.58, the value of polycarbonate. Ellipse 130 has long axis ae and short axis be and is inclined at angle 20° from horizontal. Also inclined at β=20° are parallel rays 131 which are focused to point f, one of the foci of ellipse 130, and having eccentricity of 1/n, so that ce=ae/n. The intersection of Ray u with ellipse 130 corresponds to point U in FIG. 7. The tangent of point t on ellipse 130 is vertical, and horizontal line 132 extending leftward from point t has distance 133 above focus f. This distance 133 corresponds to semi-aperture a in FIG. 7. γ is the angle between line 132 and the interior portion of the ray through that intersects point t. By Snell's Law, $$\gamma = \sin^{-1}[(\sin\beta)/n],$$

a larger angle than corresponding angle C in FIG. 7.

FIG. 8 shows graph 80 having horizontal axis 81 for far-field angle in degrees and vertical axis 82 for relative intensity in percent. Solid curve 83 shows how intensity declines off-axis to half power at 13°, with a hard cutoff at 20°. Dotted curve 84 shows encircled energy. Light exiting at and near 20° is weak because it entered from the backlight at a steep angle and because by design not all the lens will be fully illuminated when seen from 20° off-axis (on the contrary to the on-axis direction, from which it is seen as being nearly fully flashed). Overall, 13% of the light is either Fresnel-reflected or totally internally reflected back into the box, as shown by computerized ray-traces. The light that is sent back into the box is recycled therein and thus not lost. Of the light entering the transparent material, $T_2=85\%$ goes out the lens, after losses due to Fresnel reflection and truncation to a hexagonal shape, a shape utilized in some embodiments that is useful to achieve close packing of the lenses in a real product. This transmission factor has to be considered for the final efficiency, and affects the brightness gain factor as well. For stray-light reduction, such rays could be absorbed by having opaque layer 71 of FIG. 7 be reflective (diffuse) only on its bottom surface, facing the backlight, while its top surface is black or having a highly absorptive color.

Figure 9:
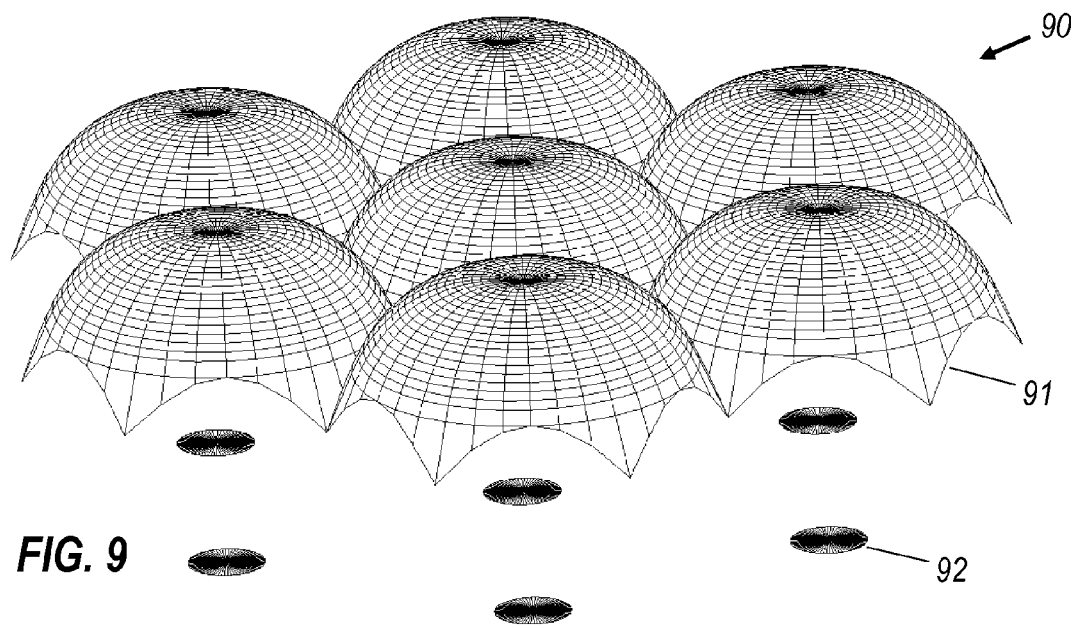
FIG. 9 shows the hexagonal configuration of an array of lenses according to some embodiments.

FIG. 9 shows hexagonal array 90 of truncated lenslets 91 positioned over critical-angle restricted-emission holes 92. The truncation losses are generally a few percent. Other truncations for tessellation, as square or rectangular, are possible.

FIG. 9 shows the upper surface of a solid sheet of transparent dielectric, comprising hexagonally arrayed lenses 91, along with critical-angle emitting holes 92. It is possible to remove the material therein that does not transmit light.

Figure 10:
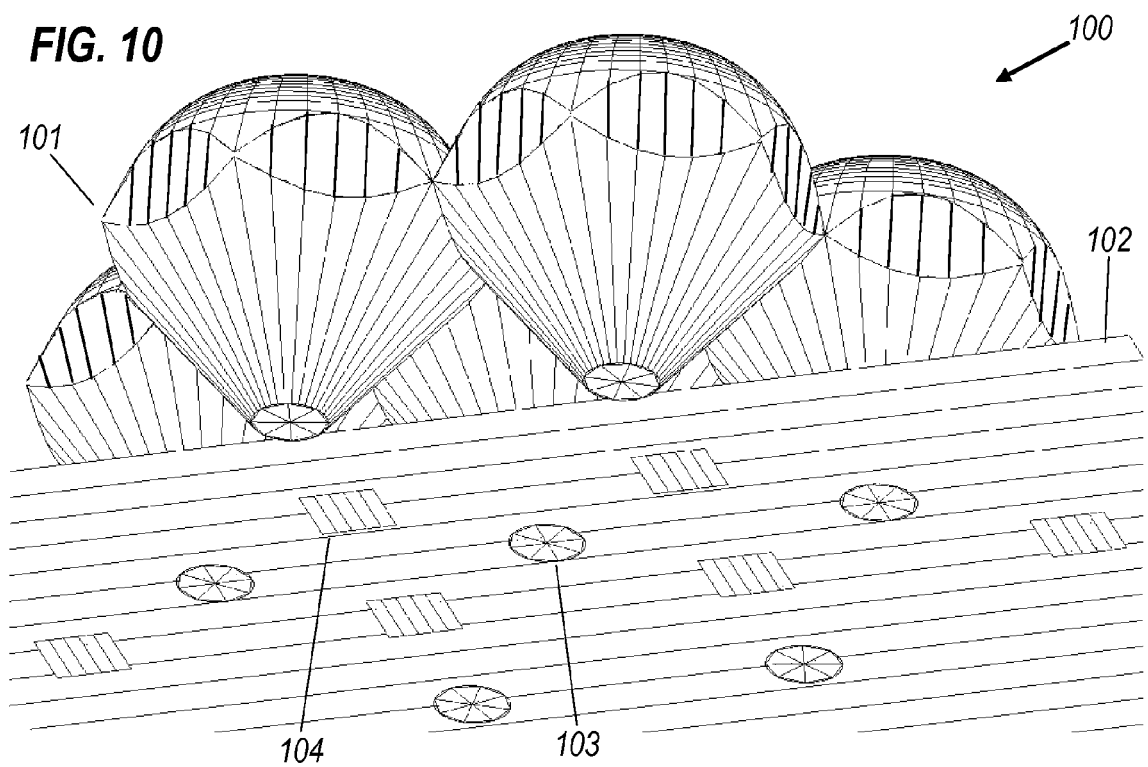
FIG. 10 shows the lens configuration of FIG. 9 with the lenses trimmed to allow room for LEDs.

FIG. 10 shows backlight 100, comprising hexagonally trimmed lenses 101 having the same cross-sectional profile as FIG. 7. Opaque diffuse reflective surface 102 has holes 103 admitting the bottom surfaces of lenses 101. For the case in which LEDs are to be placed inside, surface 102 also has square holes admitting LED chips 104, which shine downwards as in FIG. 5. The motivation for cutting out the unused parts of the lenses of FIG. 9 and FIG. 10 is to make room for LED heat-sinks (not shown) therebetween.

Figure 11:
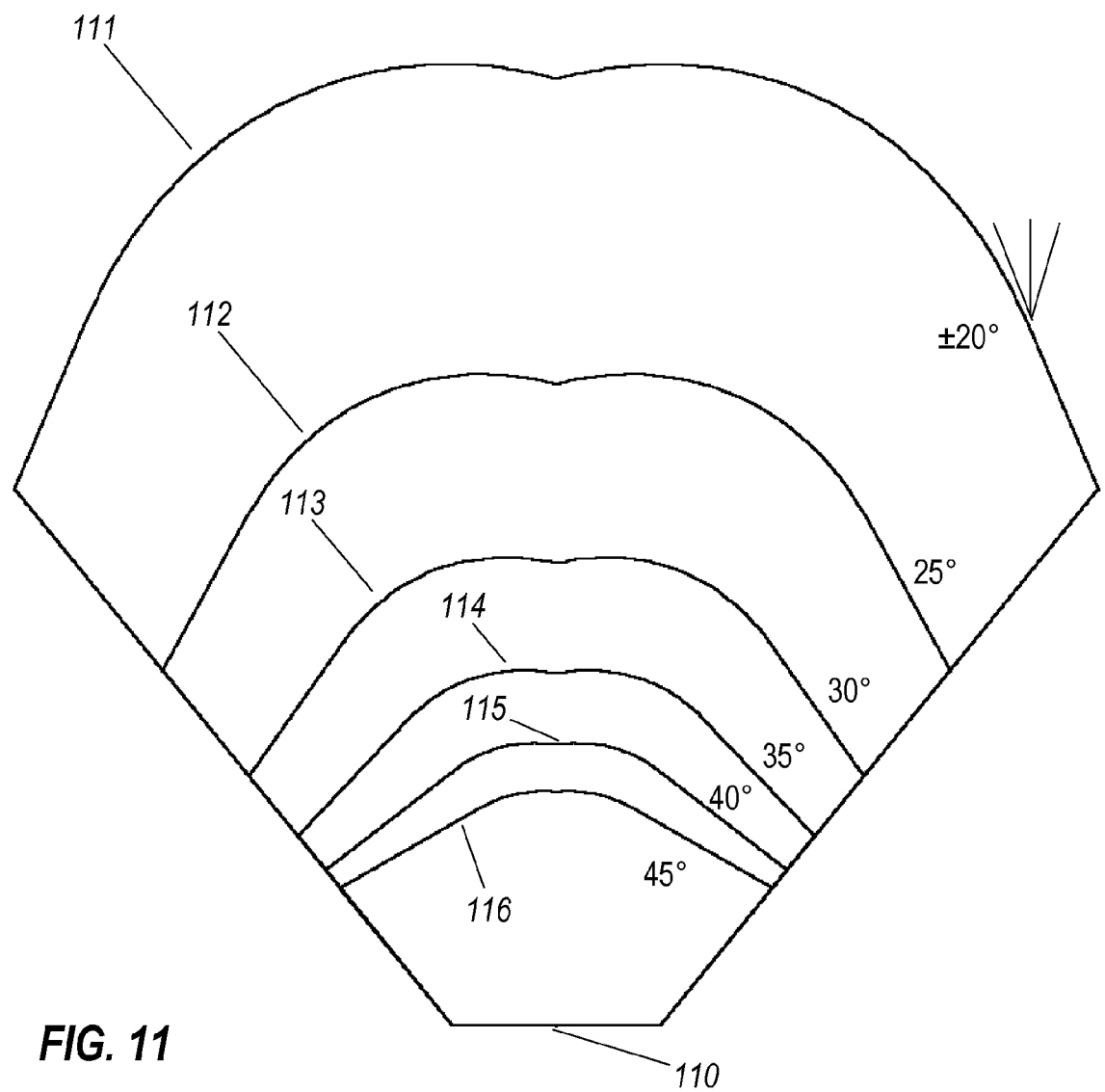
FIG. 11 shows a range of profiles for lenses that can produce emission angles from 20° to 45°.

FIG. 11 shows various lens profiles for critical-angle emitting entrance 110, with uppermost profile 111 for 20° limiting emission angle, profile 112 for 25°, profile 113 for 30°, profile 114 for 35°, profile 115 for 40°, and smallest profile 116 for 45°. The profiles for 25° to 40° have output intensity distributions with the same shape as that of FIG. 8, in that the half-power angle is about 65% of the limiting emission angle. Thus the 30° profile 113 would have about the same distribution as RBEFs, but far brighter. When the limit angle is at or greater than the critical angle, the profile does not dip in at the center, as exemplified by profiles 115 and 116.

The embodiments of FIGS. 9 and 10 provide a spectacular increase in brightness enhancement over prior systems. In some embodiments, it has a hexagonal exit area that is $1.5\sqrt{3}/\pi=82.7\%$ of the circular shape profiled in FIG. 7. Using the dimensions above leads to a hole fraction of $f_H=1/(0.827*5.196^2)=0.045$. With a 98% and 95% reflective white coatings, taking into account FIG. 4 and the lenses transmission $T_2=85\%$, brightness enhancement factors respectively of 9.6 and 5.6 are obtained. This can be compared to a factor of just above 2 that is typical for the theoretical performance of the 2-film RFEB prior system.

Besides the dramatic increase of the backlight brightness, according to FIG. 4, the backlight efficiencies within the design angle (20°) are 43% for the 98% reflective case and 25% for the 95% one. The reason for this relatively low efficiencies is the large size of the lens relative to the hole area, that is, the low value of $f_H$.

The previous embodiments were sized by the principles disclosed in FIGS. 6 and 7, which attempts to ensure that all light exits the lens. It is possible to make smaller configurations, as those in FIGS. 14 and 15, at the cost of reducing the brightness enhancement (mainly due to the increase of $f_H$) but with the improvements of having a more uniform intensity distribution within the design angle and a smaller sensitivity to changes in the reflectance of the recycling surfaces. The uniformity of the intensity distribution will imply that the majority of the lens aperture will appear illuminated when seen from different direction inside the design angle, which is beneficial to reduce the Moiré effects.

In FIG. 7, elliptical arc UAP focuses light originating from point F on the right side of the aperture. All rays emanating from point F are edge rays as there is no luminosity to the right of them, and by the fact that upon exiting the lens, they are deflected within the prescribed output angle β, as shown by rays 77.

In contrast to point P of FIG. 7, which is downward-sloping, point t of FIG. 13 will be positioned as the center of rotation for the profile of a different, smaller lens, one designed for a critical-angle emitter of semi-aperture 133.

Figure 14:
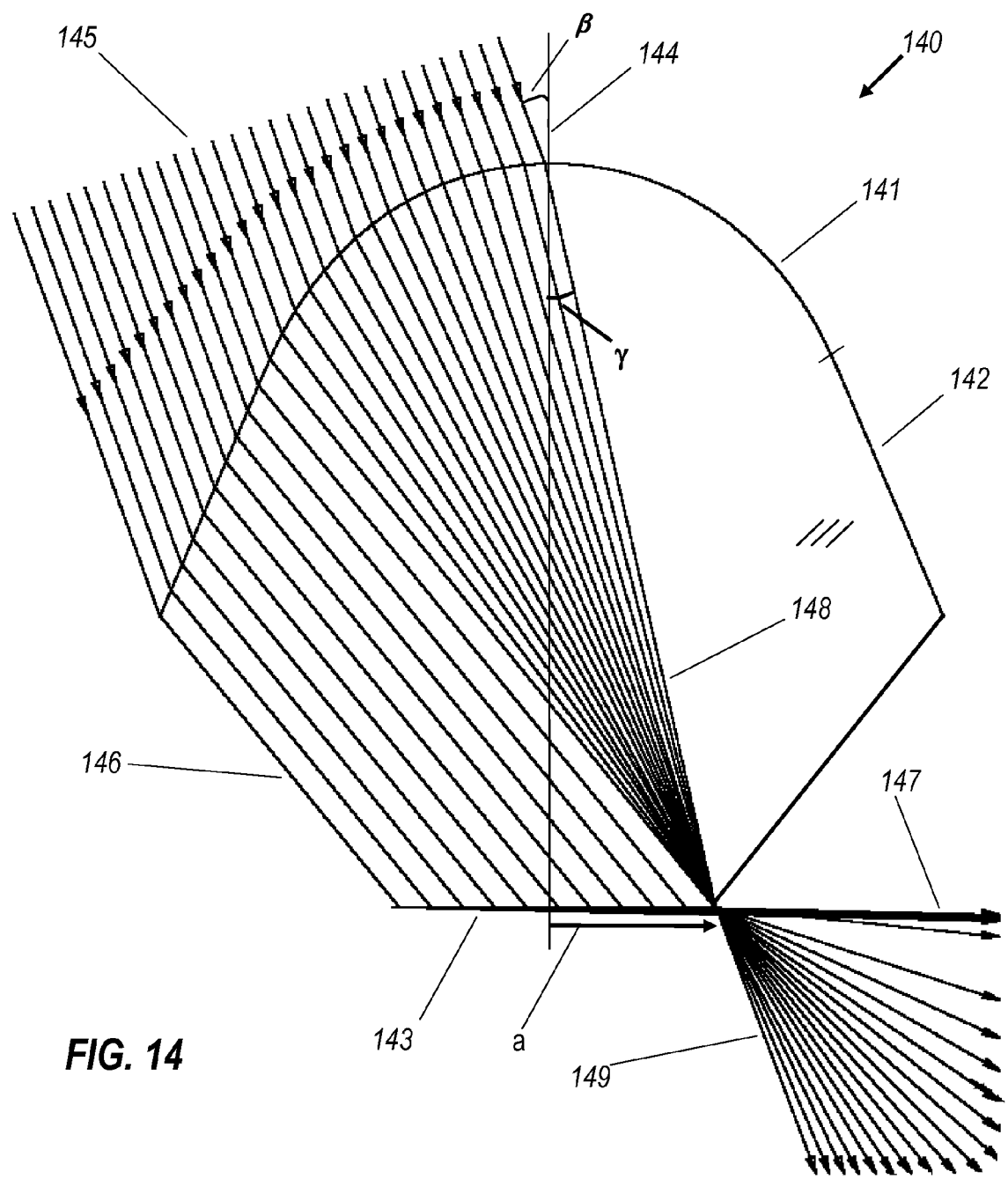
FIG. 14 shows a cross-sectional view of a small lens according to some embodiments.

FIG. 14 shows lens 140 with profile comprising off-axis ellipse 141 and straight line 142, and bottom straight line 143, revolved about vertical symmetry axis 144. Parallel rays 145, at specified angle β, enter the lens. Although this is in the opposite direction to that of FIG. 7, the reversibility of light makes them equally valid for showing how the lens operates. Critical-angle parallel rays 146 proceeds from straight line 142 to bottom straight line 143 and are refracted into horizontal rays 147. Converging rays 148 proceed from ellipse 141 to the edge of bottom 143, and are refracted into air as expanding pencil 149. Angle γ is also seen in FIG. 13 and is angle made between the rightmost ray after entering the lens and vertical symmetry axis 144. The radius a of bottom 143 is identical to that of FIG. 7, showing how much smaller this lens (hole fraction $f_H=0.21$) is than the one in that figure. Since the condition for preventing total internal reflection (TIR) has been relaxed, this lens will have some less transmission $T_2$ (around 75%) than the embodiment in FIG. 7. Brightness enhancement is still 2.8 for a reflectance of 95%, and the efficiency is 60% (to be compared with the 5.6 and 25% for the lens in FIG. 7). This is still much better efficiency and brightness than with RBEFs, which by comparison have typical values respectively of 2 and 30% (within the target field of view).

Figure 16:
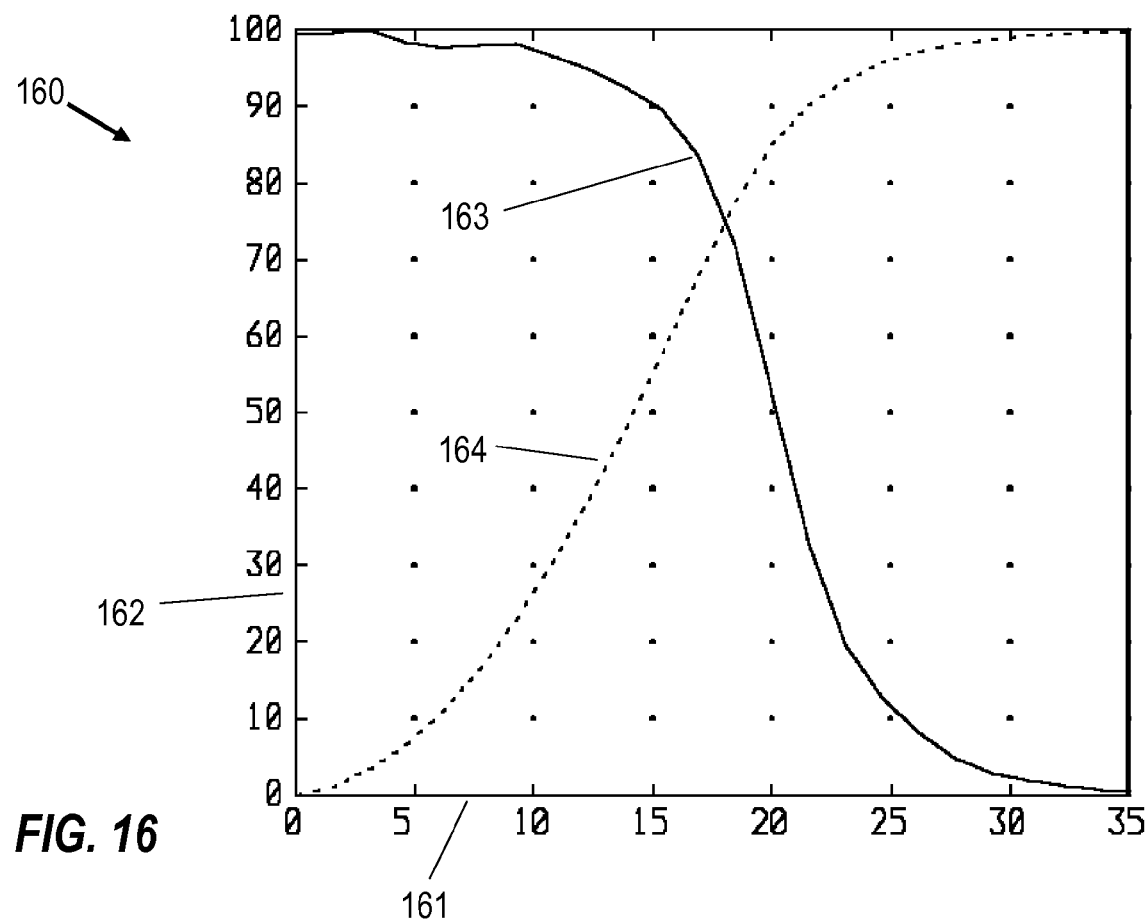
FIG. 16 shows a graphical representation of the far-field pattern that may be produced through the lens of FIG. 14.

FIG. 16 shows graph 160 having horizontal axis 161 for far-field angle in degrees and vertical axis 81 for relative intensity in percent of lens in FIG. 14. Solid curve 163 shows how intensity declines with an increase in the off-axis angle to half power at 20°, which was the original cutoff angle for the optic of FIG. 8. Dotted curve 164 shows encircled energy. The distribution of light to 20° is much flatter than in FIG. 8, with 85% of the beam's light within the specified angle, or half the light entering the lens. The situation is similar for larger values of limiting angle β.

Figure 15:
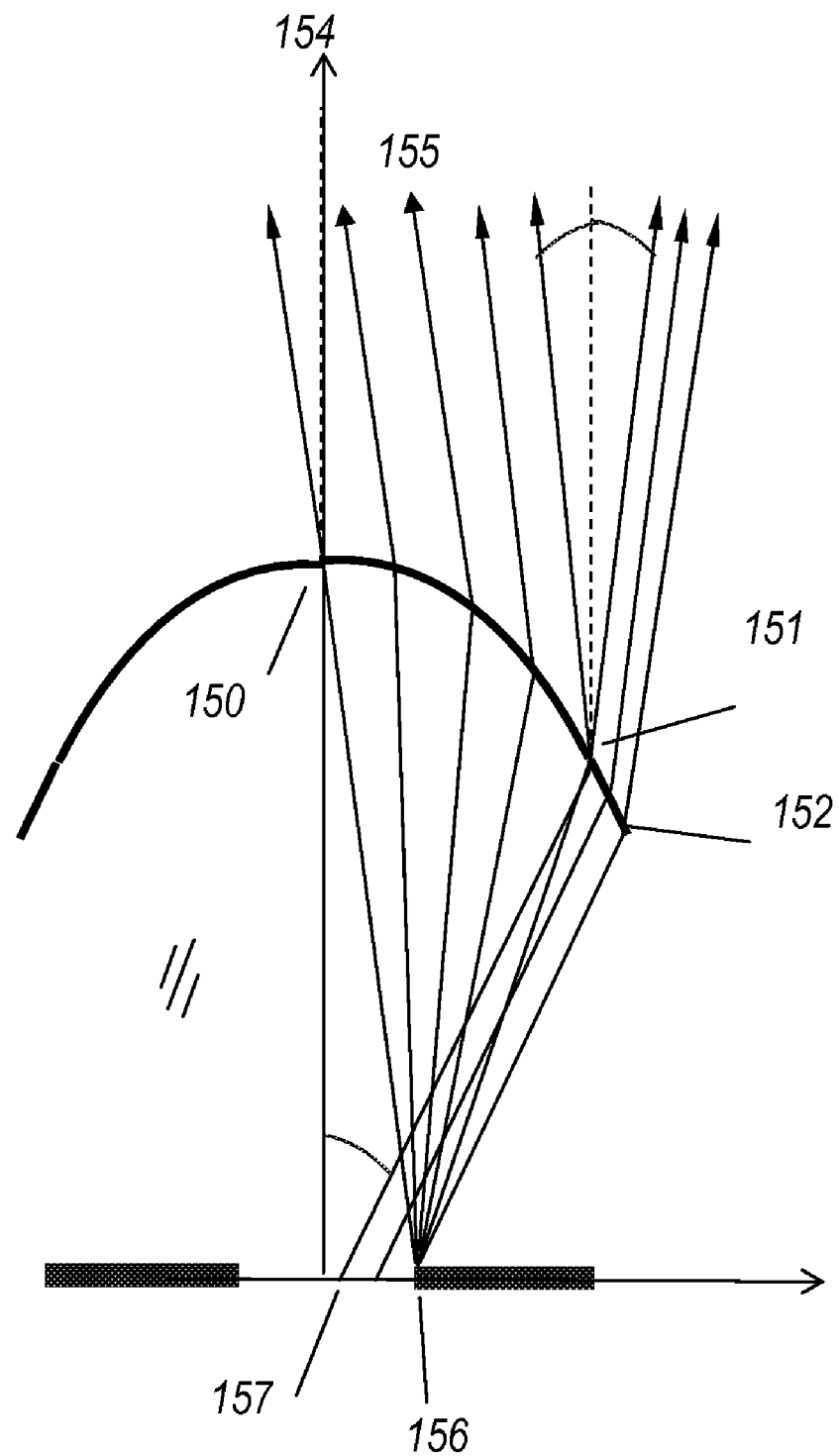
FIG. 15 shows a cross-sectional view of an intermediate-size lens according to some embodiments.

FIG. 15 shows another possible embodiment, with a profile comprising off-axis ellipse from vertex 150 to vertex point 151 and the straight line between points 151 and 152, revolved about vertical symmetry axis 154. Unlike the case in FIG. 14, parallel rays 155 on the converging side of off-axis ellipse focus on point 156 on the same side of vertical axis symmetry 154. Also unlike the design shown in FIG. 7, there is no slope discontinuity at the vertex 150. The conical section is shorter, reaching only up to point 157 instead of covering the complete hole. This construction also guarantees that no TIR will occur, leading to a smaller hole factor ($f_H=0.17$) than the lens in FIG. 14, and 55% efficiency and 3.6 gain.

Figure 12:
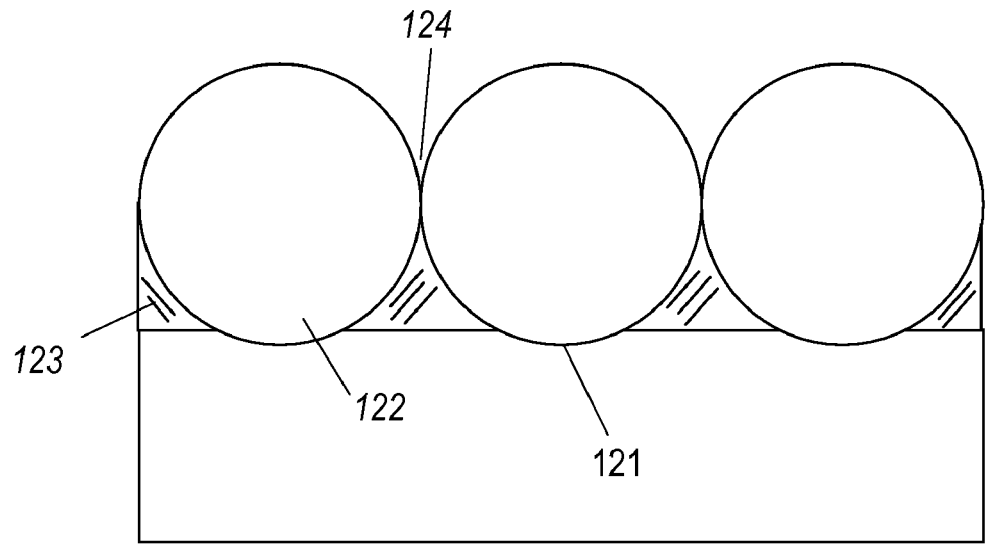
FIG. 12 shows a cross-sectional view of a file according to some embodiments where spherical balls are embedded in a diffuse reflective material.

FIG. 12 shows system 120, which is based on spherical lens 122 and is another possible lens profile that can be produced by a different method of manufacture than the previous embodiments. Sphere 122 can be replicated and the copies placed near or in contact with each other to achieve maximum two-dimension close packing (such as a planar tessellation based on equilateral triangle grid or a square grid). Exemplary contact point 124 is shown in FIG. 12. A reflective binder 123 covers the inferior hemisphere of the spheres but leave open the windows 121 for light input. The profile of Windows 121 can be either spherical or be made flat by trimming the circular arc. This system's lit appearance will not be fully flashed in the near field, but if that is required in the near field, the spherical lenses can be trimmed vertically and made into hexagonal or square parts, as seen in plan view. This may result in some light be sent in unwanted directions (unless shields are installed), but will achieve maximum flashing in the near field.

It is of course possible to generate ellipse-cone profiles intermediate between that of FIG. 7 and that of FIG. 14. Also, the present embodiments are not limited to elliptical-arc or circular embodiments, but generally contemplate any lens profile delivering a desired output-intensity distribution from a known distribution of light refracted by an aperture illuminated by the interior of a backlight. For example, a flat intensity profile within a specified angle is often more important than efficiency or lack of spill light, and could lead to a non-elliptical lens profile.

This LBEF embodiment would have greatly enhanced brightness over RBEFs because at least:

(1) Its efficiency is much higher.

(2) Its brightness enhancement is significantly greater.

The greatly superior performance of the present embodiments translates to substantially lower power requirements for backlights, which are the major battery drain of portable computers.

It is also possible to combine at least some of the present embodiments with reflective polarizing films (as currently done with the RBEFs). A reflective polarizer can be placed in front of the microlenses, and reflect back through the holes a fraction of the unwanted state of polarized light (some will be lost as it is absorbed by the opaque surface surrounding the microlenses), which will be recycled (depolarized) by the scattering in the white diffuse reflections. Alternatively, the polarizer can be placed just above the holes or below it. This last approach preserves the beam output angle that is produced with an original system without the polarizing film.

The manufacturing of the previous embodiments can be done in some implementations by compression molding of plastics using a variety of approaches or by a combination of injection molding and material deposition techniques, such as silk-screening, spray-painting, ink jet printing and vacuum deposition, to name a few. In one approach, the collimator optical component is made separately from the feature that acts as the reflective recycling optic, and which is also used to define the holes. This can be accomplished via the technique of multi-part molding, whereby one part is molded first and then the desired feature is molded in situ onto the first. In this molding process, one of the two materials can be a transparent dielectric plastic and the other can be an opaque white plastic. Examples of three potential principle multipart-molding approaches available at this time include retractable-core, multiple-cavity and rotating-core.

An alternative method is to use the collimating optic of the LBEF to concentrate the light onto a photoresist layer, which initially covers the entire lower face of the collimating optic element. Collimated or partially collimated light is shined from above onto the collimating optic and the optic acts in the reverse direction as a concentrator to focus the light onto the photoresist layer. The radius of the focal circles striking the photoresist layer is related to the acceptance angle of the optic and several other parameters, and can be adjusted so that the resultant hole is the size desired and in some instances exactly the size required. This approach allows for self-aligned production of holes within the design acceptance angle of the optic, although it may require special attention to ensure sharp edges for the holes.

The spherical lens embodiment of FIG. 12 can be made by partially embedding closely spaced spherical balls, made of glass, plastic or other relevant material, in a layer of, for example, white paste or paint. Another manufacturing approach is to injection mold a white reflective layer having spherical female features as one piece. The aperture holes are integrated into this highly diffuse reflective (typically white) opaque part. The spherical balls are then placed in position each into its own spherical void, allowing accurate alignment of the spherical lenses to the holes. The balls are then bonded to the injection molded part (or permanently held in place) by any number of means, such as sonic welding, adhesive attachment or capillary solvent welding. One alternative approach to this is to hold the balls in place using a heat shrink wrap plastic film. The film does not need to take the shape of the balls to work but just need to partially conform to the shape and to structurally be held securely at the borders. Yet another approach is a conformally coated plastic layer on the top surface of the spherical balls, once they are in position. Such a conformal plastic coating will adhere to the balls and take their shape, thereby filling in any voids between them. Such materials are readily available and are used in the PC board industry to protect components. One such product is sold by MG Chemicals of Toronto, Canada called Silicone Conformal Coating 422.

Figure 17A:
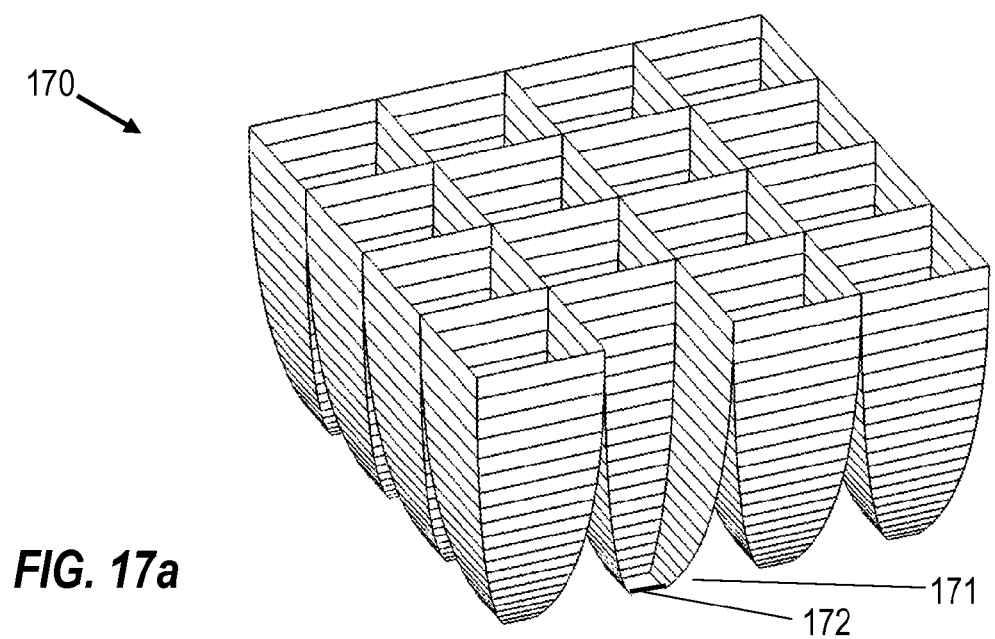
FIG. 17a is a perspective view of a CPC array according to some embodiments, which may be employed in a brightness enhancement device.

Beyond these lenses, other collimating means can be used in conjunction with the holes atop the backlight of FIG. 1. The compound parabolic concentrator (CPC) is an example that may be employed. FIG. 17*a* shows array 170 of square CPCs, with CPC 171 shown for the sake of clarity without one wall. Entry aperture 172 admits light from a backlight. The walls of the CPCs would be specularly reflective, such as with a metallic coating, or a dielectric coating optimized for grazing incidence by the light of the wavelengths of a particular color of LED.

Figure 17B:
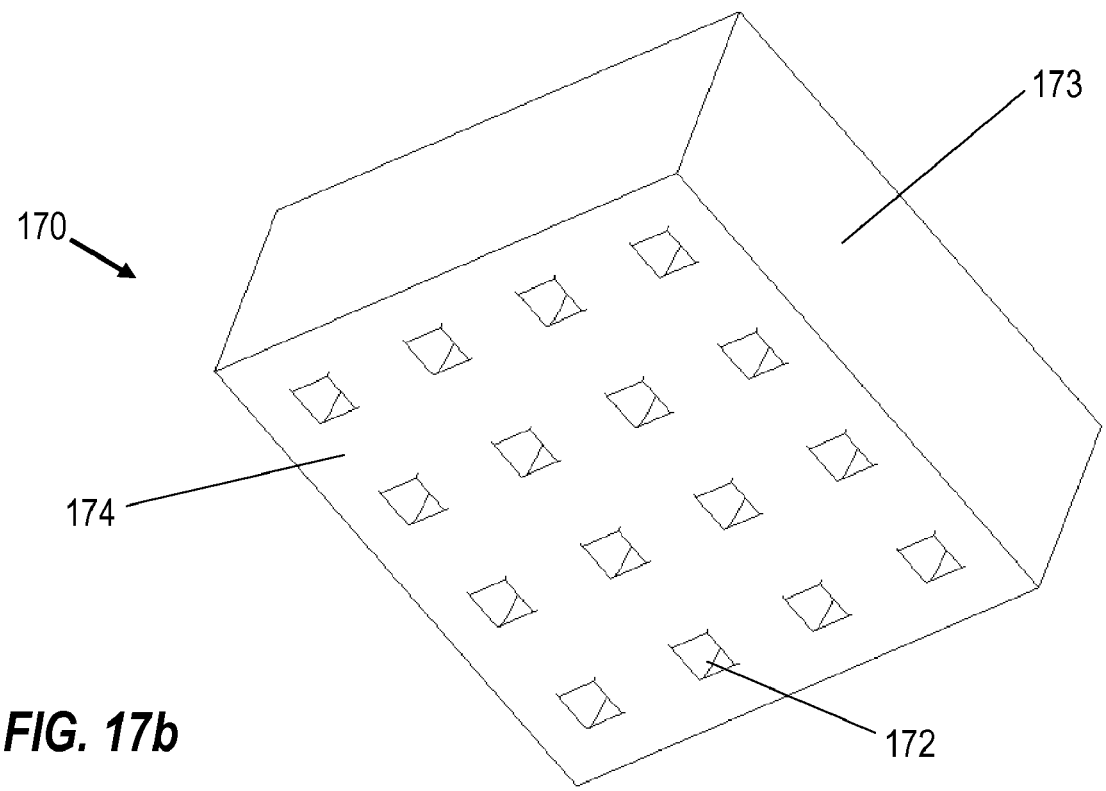

FIG. 17*b* is a rear view of array 170, showing apertures 172 penetrating through diffuse reflector 174. For the sake of clarity edge wall 173, and diffuse reflector 174 are not shown in FIG. 17*a*.

Figure 18:
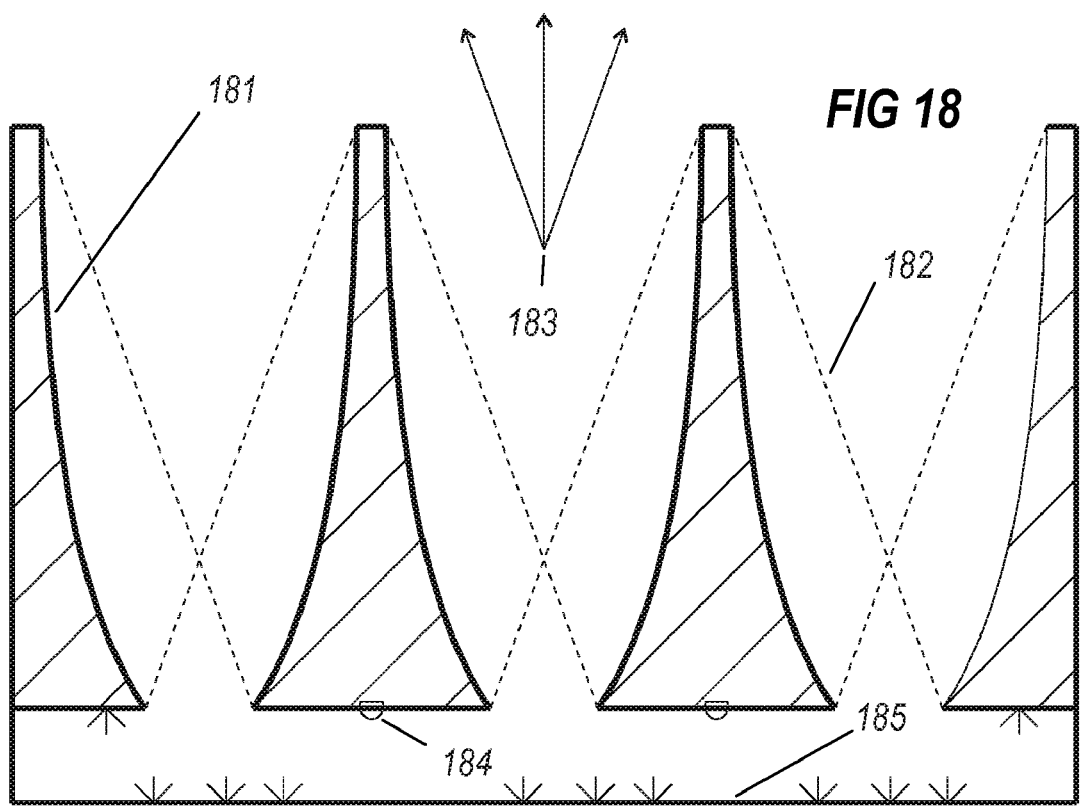
FIG. 18 shows a cross-sectional view of LEDs cooperated with the CPCs of FIG. 17a according to some embodiments.

FIG. 18 is a cross section showing metallic CPCs 181 with edge rays 182 defining the limits of angular output 183. LEDs 184 are facing downward and are mounted on the bottom of the CPC walls, so that they act as heat sinks. Diffuse reflector 185 acts as the bottom of a backlight.

Figure 19:
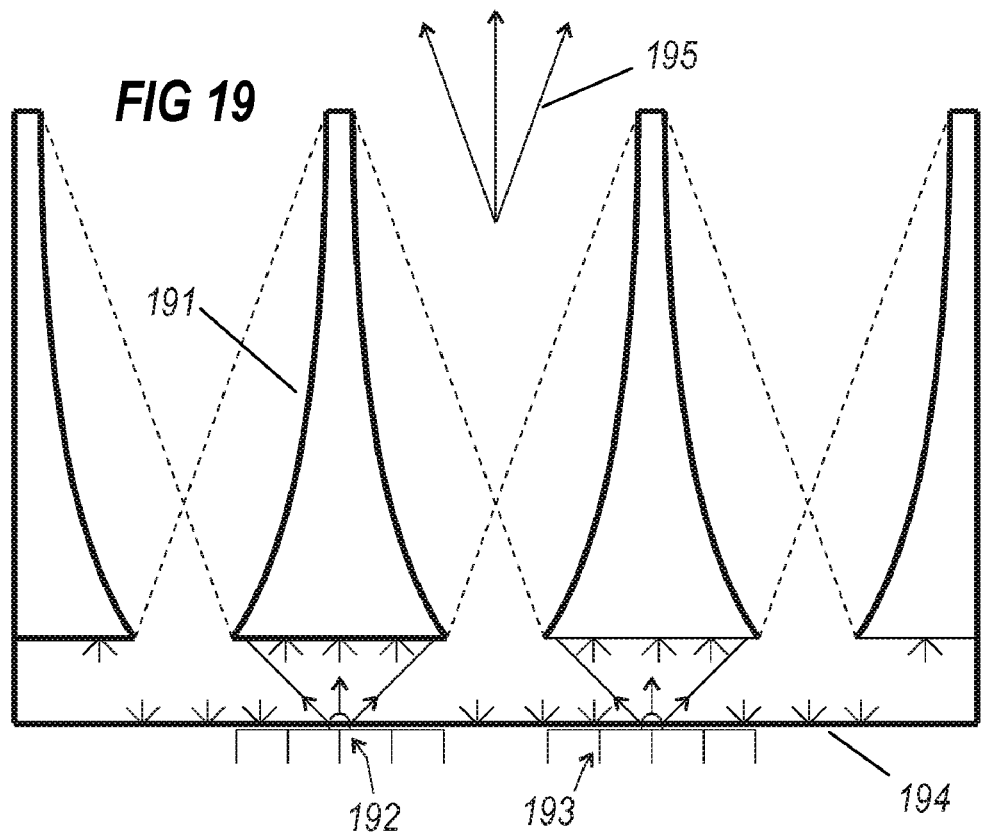
FIG. 19 shows a cross-sectional view of a portion of the CPC array of FIG. 17a with LEDs at different positions relative to FIG. 18.

FIG. 19 shows CPCs 191 and LEDs 192 mounted below with angular output restricted so as to only shine on the diffuse reflective bottom surface of 191. Heat sink 193 provides cooling to LEDs 192. Diffuse reflective bottom surface of 194 provides diffuse light for output 195. Metallic CPCs 191 can be manufactured by injection molding a suitable substrate out of a highly diffuse reflective material such as titanium dioxide doped plastic. The bottom surfaces of the injection molded part become the diffuse reflective surfaces of CPCs 191. Reflective materials are then deposited onto only the side walls of CPCs 191 using industry-standard methods such as vacuum deposition. This approach can also be applied to several other embodiments such as that in FIG. 18.

Figure 20:
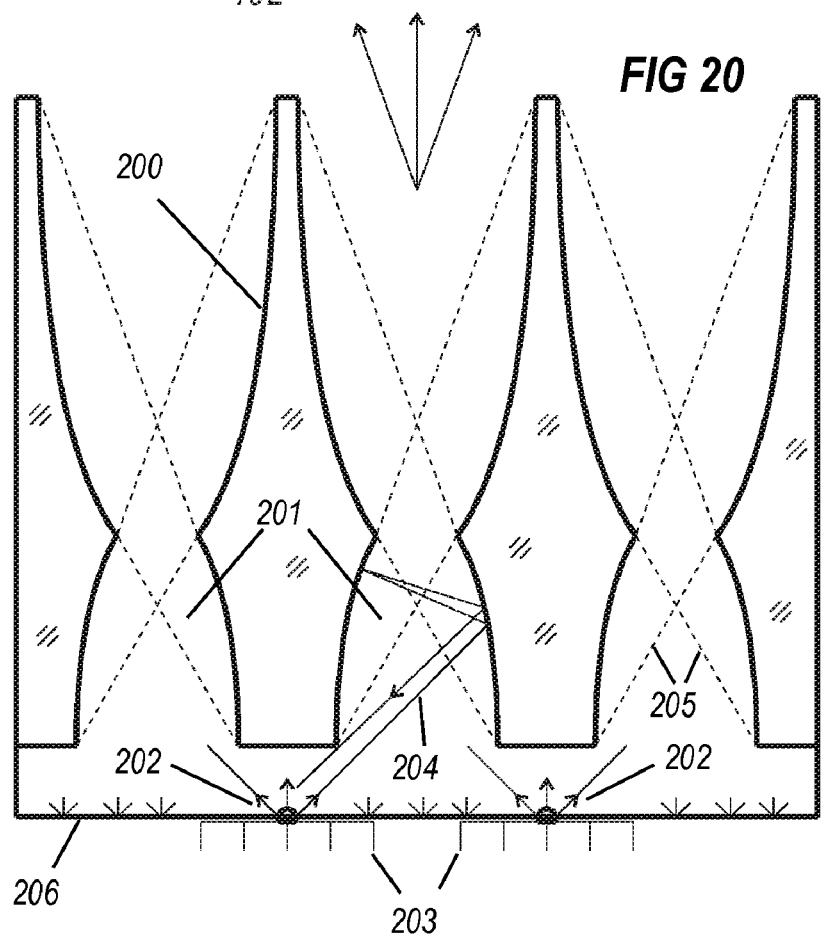
FIG. 20 shows a cross-sectional view of an alternative CPC arrangement according to some embodiments.

FIG. 20 shows an alternative configuration for the case of LEDs with wide or hemispheric emission, unlike LEDs 192 of FIG. 19. Upper CPC 200 is atop inverted lower CPC 201. Hemispherically emitting LEDs 202 are cooled by heat sinks 203. Ray 204 is beyond the acceptance angle shown by dotted lines 205, and thus can be seen returned by two reflections within lower CPC 201, shining onto diffuse reflective bottom surface 206.

Figure 21:
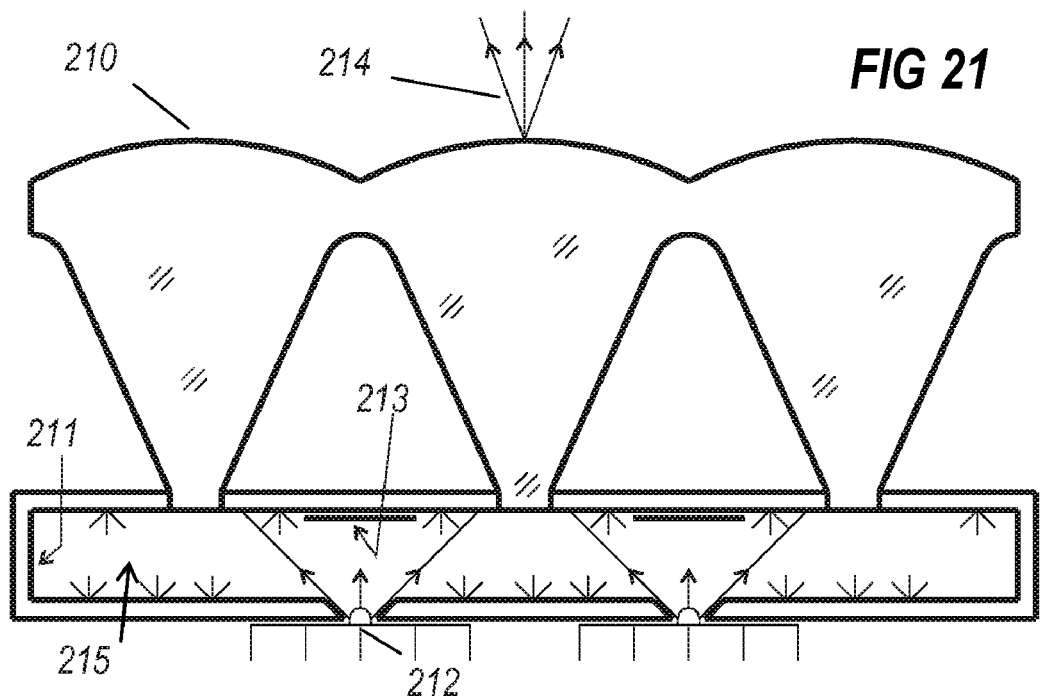
FIG. 21 shows a cross-sectional view of a backlight with phosphor patches combined with a lenticular brightness enhancement device according to some embodiments.

FIG. 21 shows lenses 210 that are intermediate in scale between those of FIG. 7 and FIG. 14. They are mounted atop backlight 211, at restricted angles into which shine blue LEDs 212. Positioned therefrom just above are phosphor patches 213, which absorb blue light and radiate photostimulated yellow light into box 215. The blue and yellow light are mixed therein and collimated by lenses 210 for to form angularly restricted white output 214.

Figure 22A:
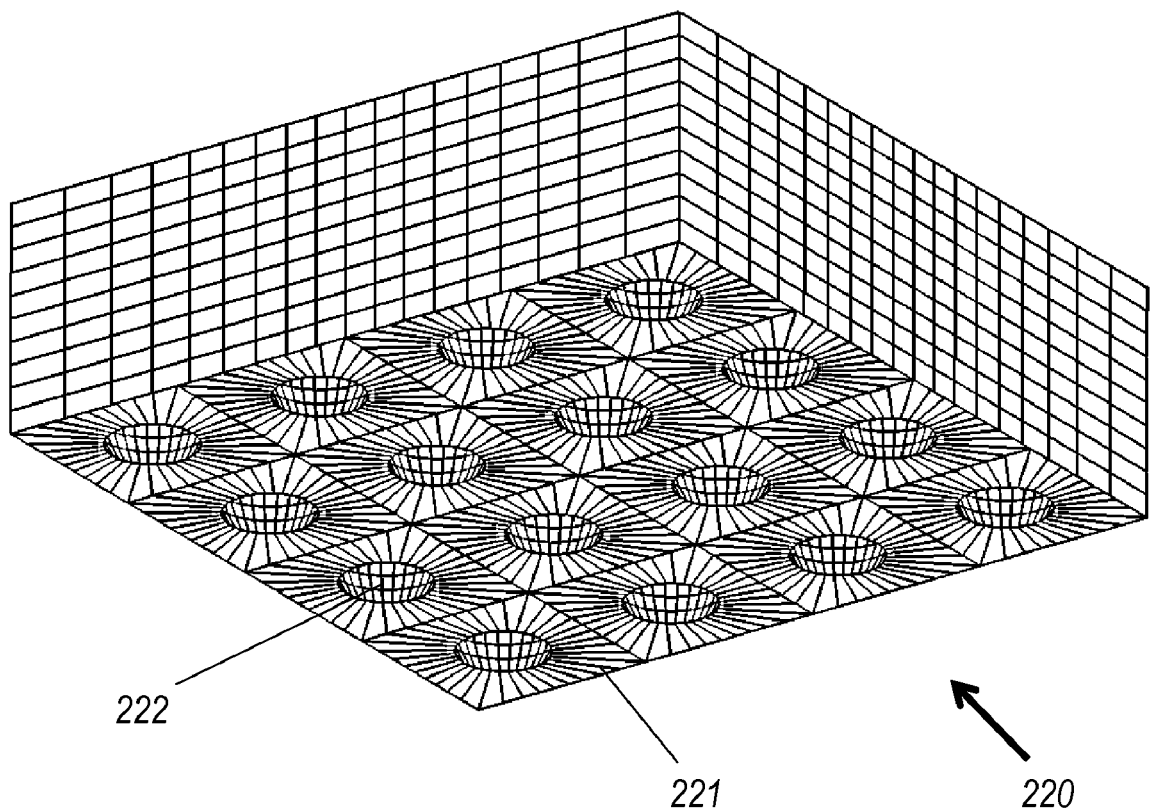
FIG. 22a is a perspective view from below of the low-index portion of a three-film embodiment.

A hybrid configuration is possible when two transparent materials are available with low and high index, such as 1.4 of silicone and 1.6 of polycarbonate. Then it is possible to have a three-part film, including as previously a bottom opaque diffuse reflective layer with holes. FIG. 22a is a perspective computer-graphic view of low-index thin film 220, with diffuse reflective material coated lower surface 221 and apertures 222. Thin film 220 and the coating 221 constitute two of the three aforementioned parts.

Figure 22B:
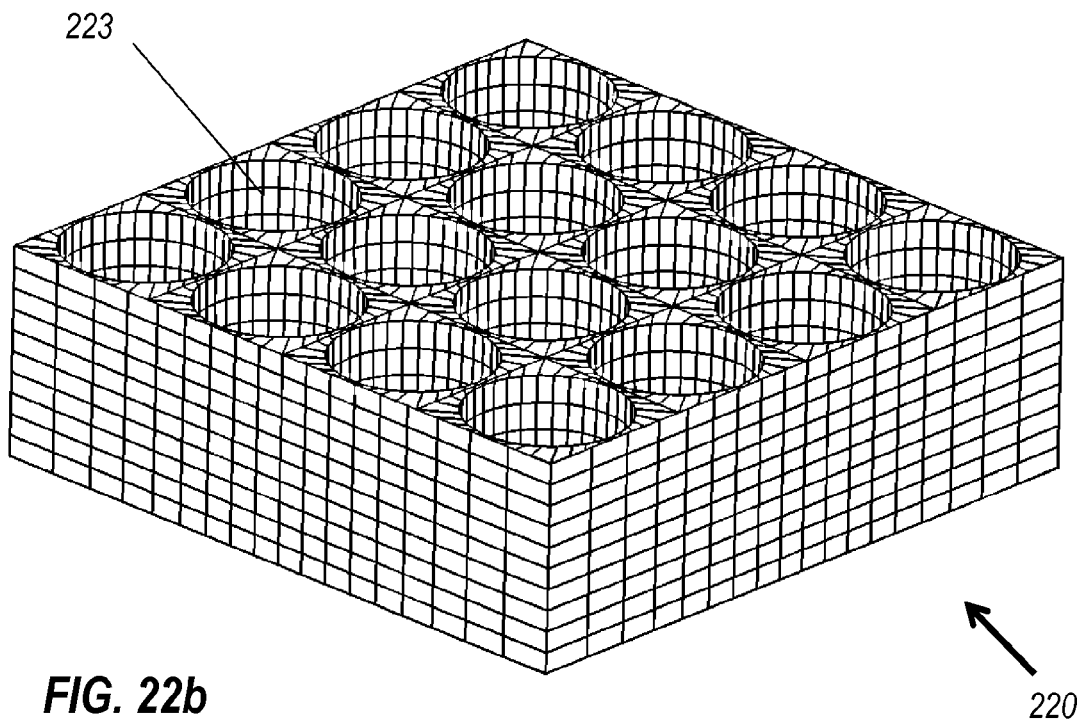

FIG. 22b is a similar perspective view from a different direction, of thin-film 220, also showing the interior of conicoidal voids 223, which may be straight cones, curved-profiles, such as angle transformers and CPCs, or other shapes known to those skilled in the art of nonimaging optics. These voids are then filled with a high index material in order to form dielectric optics that will collimate the light admitted by the holes in the bottom diffuse reflective layer. An example profile for this dielectric optic is a nonimaging angle transformer.

Alternatively, thin-film 220 can be made of a low index of refraction material that is opaque. In this instance if the material is white and/or is highly reflective, the lower coated surface 221 does not need to be deposited on thin-film 220, since the molded bottom surface of the thin-film becomes the reflector. In order for it to function as a diffuse reflector in some embodiments, its bottom surface can be textured.

The two lens-versions, respectively depicted in FIG. 11 & FIG. 14, are different in size, given the same input hole and output angle. Film manufacturing typically is easier as lens diameter gets smaller, but lens diameter is also a consideration regarding the pixel size of the backlight. Whether using the LBEF with its upper array of lenslets or the CBEF (as exemplified by the embodiment of FIG. 17a) with its array of square-CPCs, Moiré effects can be sufficiently annoying as to cause a quality-control rejection when the backlight is tested. The collimator diameter should be small enough relative to the larger pixels, such as to preclude Moiré effects. The hexagonal pattern shown in FIG. 9 and FIG. 10 would suppress much of the Moiré effects when backlighting the typically rectangular pixel array of LCDs, if none of its triaxial directions were aligned with the horizontal or vertical rows of pixels.

Figure 23:
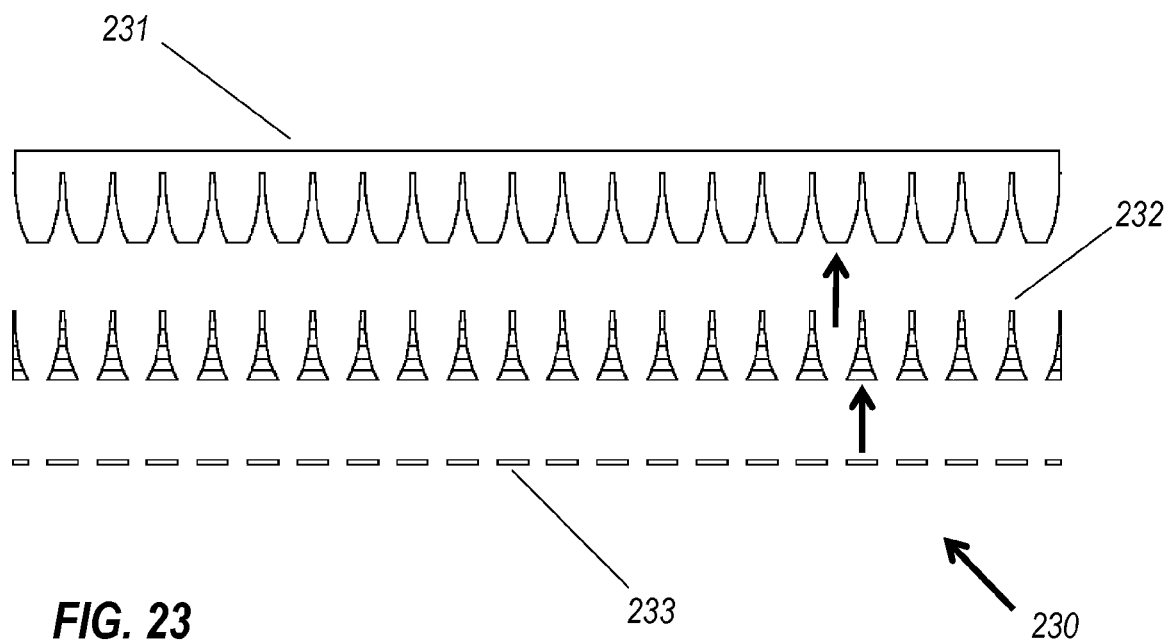
FIG. 23 is a cross-sectional view of a tripartite linear BEF.

It is possible for at least some of the ideas of the present embodiments to be applied to linear versions as well. FIG. 23 shows tripartite brightness enhancing film 230, comprising upper high-index array 231 of linear troughs (shown as CPCs but could also be V-troughs or other profile), lower low-index array 232 of interspersing negative troughs, and bottom array 233 of diffuse reflective (can also be specular) stripes coating the bottom of array 232. Various forms of double molding with paint inclusion are feasible for producing this part. Also, the material of bottom array 232 can be deposited by ink jet printing or a dipping process. In the dipping process, according to some embodiments, lower low-index array 232 is partially submerged in a tank of paint or other appropriate material, so that only the very bottom surface of bottom array 232 is coated. After the coating has cured, the hybrid dual-component is then combined with upper high-index array 231.

Figure 24:
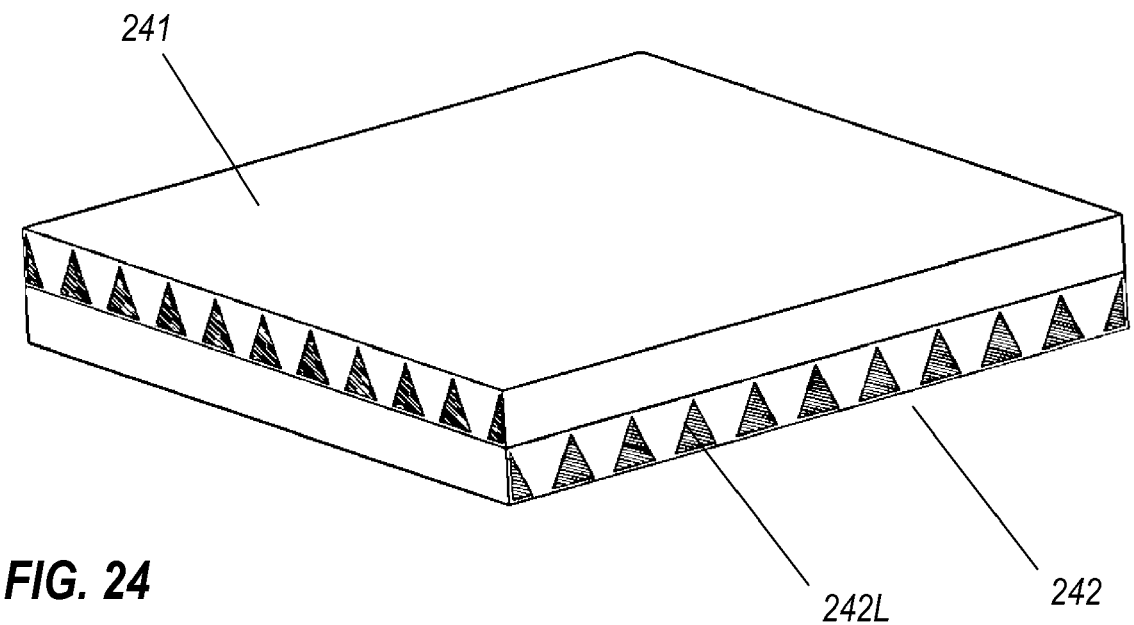
FIG. 24 is a perspective view of two such BEFs of FIG. 23 in a crossed configuration.

FIG. 24 shows two such linear films in a crossed configuration, with upper film 241 and lower orthogonally oriented film 242. Also shown is low-index portion 242L of lower film 242. On upper film 241, in some embodiments, the reflective stripes (not shown) are specular, while the bottom can be either specular or diffuse.

Figure 25:
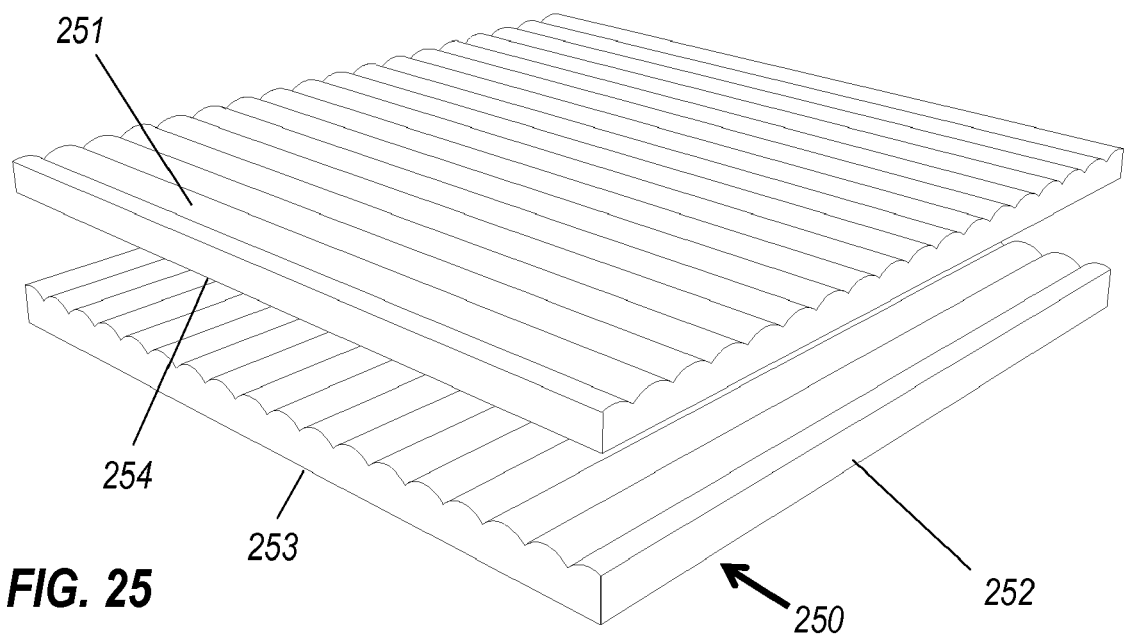
FIG. 25 is a perspective view of another embodiment with two linear LBEFs in a crossed configuration.

FIG. 25 shows cross-LBEF linear film 250 also in a crossed configuration, comprising upper solid dielectric film 251 and lower orthogonally oriented solid dielectric film 252. On the bottom side of film 252 is deposited reflective layer 253 (not visible in drawing), which can be specular or diffuse. Reflective layer 253 is comprised of an array of stripes that define an array of stripe holes centered and aligned in one direction with the one-dimensional array of linear lenses on the top surface of film 252. Alternatively, reflective layer 253 can be deposited to form a two-dimensional array of holes at the bottom side of film 252 as exemplified in the configuration of holes 172 of FIG. 17b. On the bottom side of film 251 is deposited specular reflective layer 254 (not visible in drawing). Reflective layer 254 is comprised of an array of stripes that define an array of stripe holes centered and aligned in one direction with the one-dimensional array of linear lenses on the top surface of film 251.

Alternatively, reflective layer 254 can be deposited to form a two-dimensional array of holes at the bottom side of film 251 as exemplified in the configuration of holes 172 of FIG. 17b. In one embodiment the foci of lenses 251 and lenses 252 all are on the entrance plane of 253. In some implementations of a real device films 251 and 252 are placed in contact with each other.

Figure 26A:
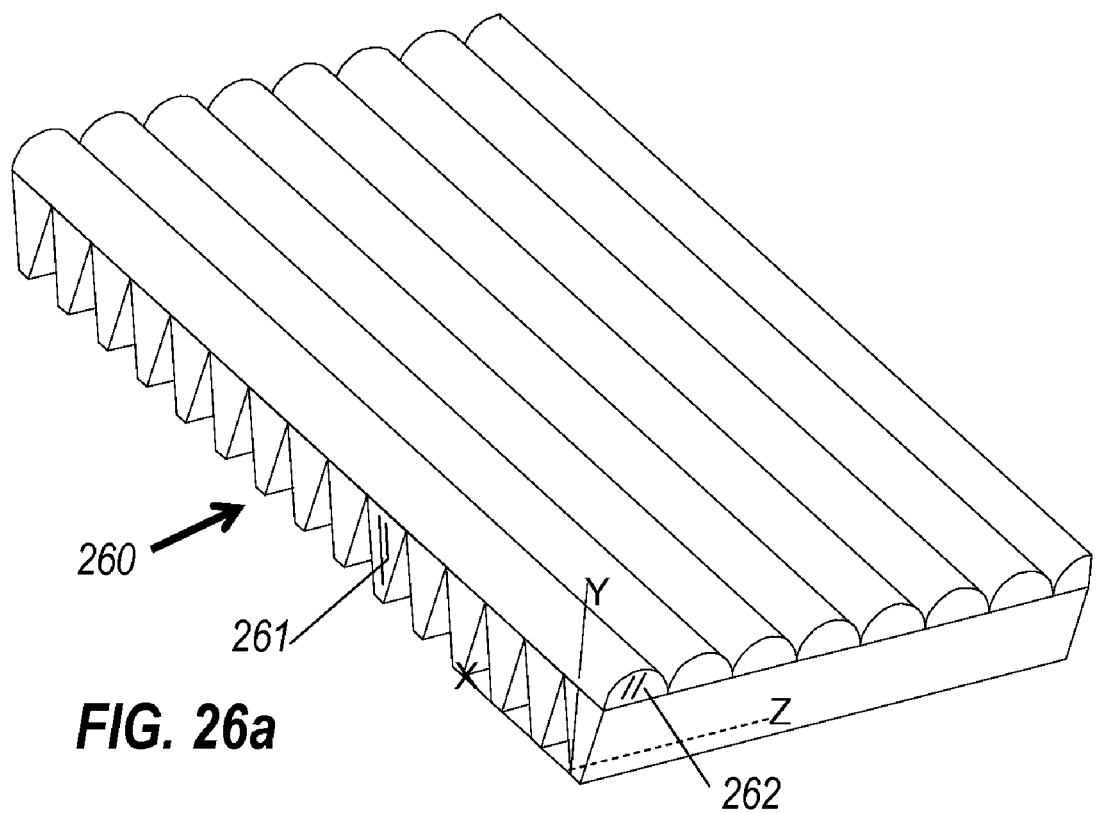
FIG. 26a is a perspective view of a crossed linear BEF configuration where the bottom and top optical features are molded in one piece.

FIG. 26a shows an alternative embodiment to the cross-LBEF linear film of FIG. 25 in which the cross optical elements are molded as one piece using a solid transparent dielectric material. FIG. 26a shows cross-LBEF 260 comprising linear solid dielectric troughs 261 whose axes of extrusion are parallel to axis z (shown in dotted line), and linear dielectric lenses 262 whose axes of extrusion are parallel to axis x (shown in solid line), such that the axes of troughs 261 and lenses 262 are oriented at 90 degrees to each other. Also shown is y axis which is oriented perpendicular to both axis x and axis y forming a three-fold orthogonal set of coordinates. Linear solid dielectric troughs 261 are shown in FIG. 26a having a conical profile, however, the profile can take on any suitable form such as a CPC, or others known to those skilled in the art of nonimaging optics. Linear dielectric lenses 262 are shown having a circular profile but are not limited to this profile. Optionally, linear dielectric lenses 262 can also be formed as a two-dimensional array of lenses such as a multiplicity of toroidal lenses. This option provides greater control of the beam pattern and allows for non-symmetrical beam output that is required for some applications.

Figure 26B:
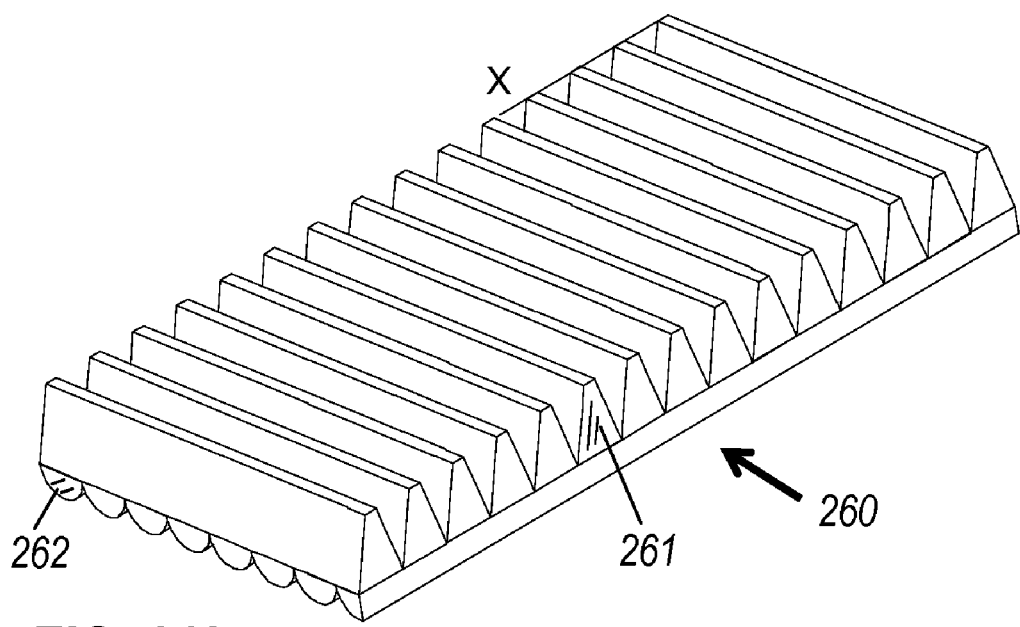
FIG. 26b is another perspective view of the BEF of FIG. 26a from a different direction.

FIG. 26b shows the cross-LBEF 260 from another view where the linear solid dielectric troughs 261 are visible.

In some embodiments the cross-LBEF 260 of FIGS. 26a and 26b includes a reflective mask with holes located on the same plane as the bottom surface of linear dielectric troughs 261 of FIG. 26a that can aid in the proper function of these embodiments. The holes of the reflective mask, (which outside the region of the holes can be either diffuse or specular reflective), are aligned with the lower and upper features such that there is a 2-dimensional array of holes. The center of each hole in the array of holes is located on the bottom plane of solid linear troughs 261 of FIG. 26a. The x and z coordinates of the center of the holes are at the intersection of projections of the central axes of trough 261 and lenses 262 onto a common plane, such as the one defined by x and z axes of FIG. 26a. The shape of the holes can be square or take on a variety of shapes as needed.

Figure 26C:
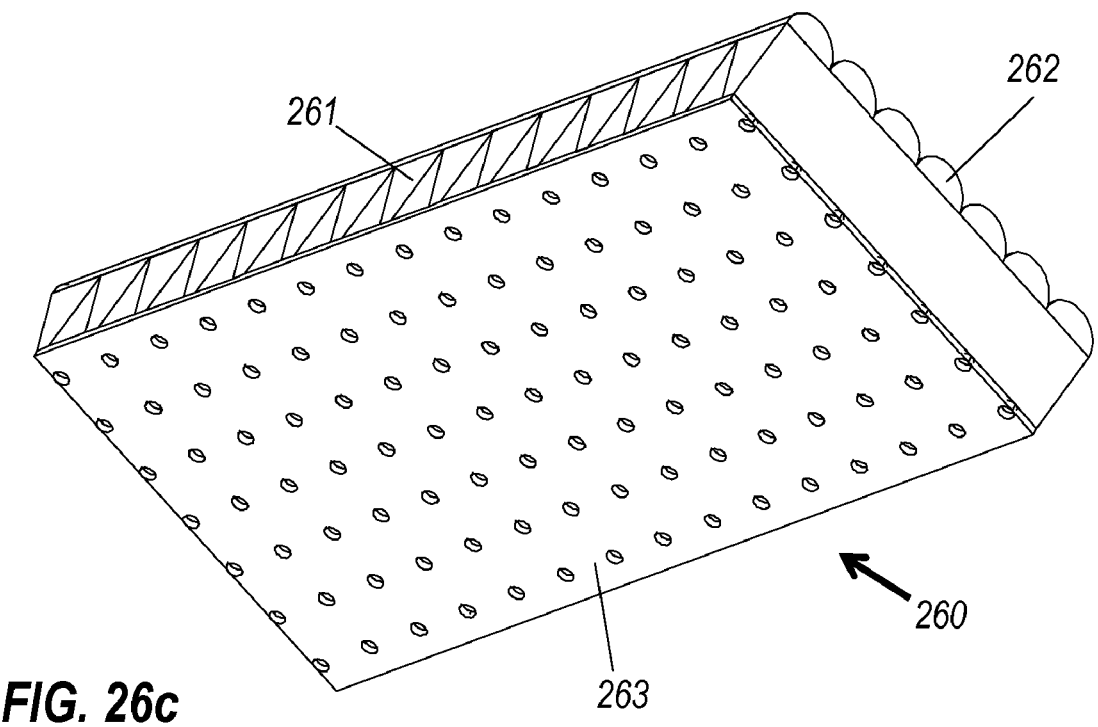
FIG. 26c is still another perspective view of the BEF of FIG. 26a with the addition of a reflective mask having a 2-dimensional array of aperture holes.

FIG. 26c shows an example of a reflective mask for cross-LBEF 260 comprising reflective mask 263 with a 2-dimensional array of circular holes in a square grid pattern. Alternatively the bottom surfaces of solid linear troughs can be coated with specular reflective material outside the area of the holes.

One possible way of manufacturing a reflective mask for the embodiment of FIGS. 26a, 26b and 26c, is to form a plastic sheet having a 2-dimensional array of holes (by a wide range of means, some of which are described above) and aligning and bonding this sheet to the bottom surface of linear dielectric troughs 261 of FIG. 26a. This can also be accomplished via the technique of multi-part molding, mentioned earlier, whereby one part is molded first and then the desired feature is molded in situ onto the first.

Figure 27:
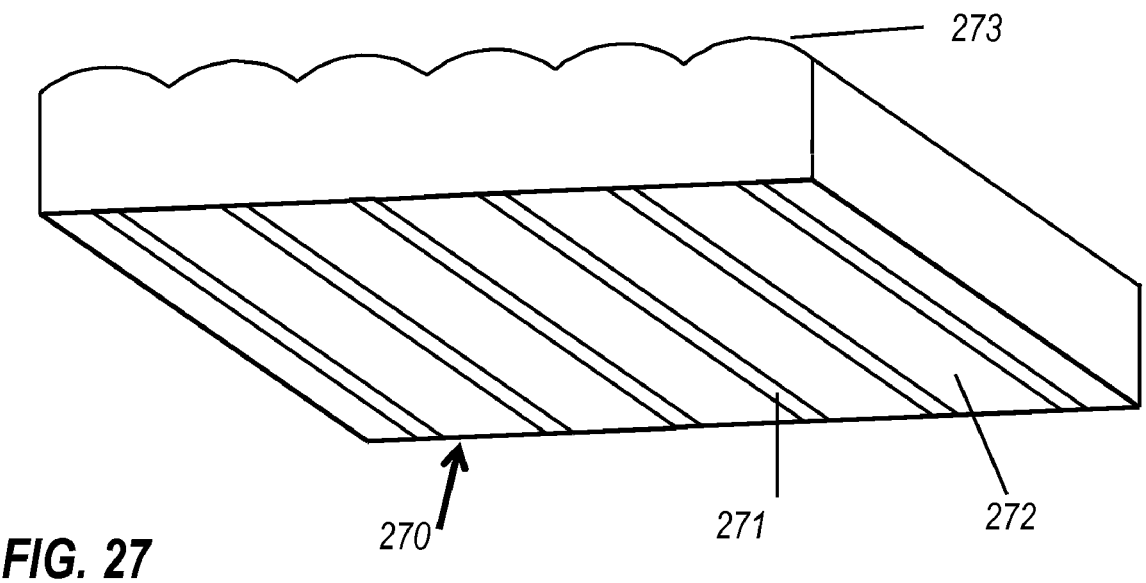
FIG. 27 is a perspective view of a single linear BEF of the type shown in FIG. 25 having a non-uniform output.

FIG. 27 shows a perspective bottom view of a linear film 270 that uses the same architecture as one of the two components in the cross-LBEF film of FIG. 25. Linear film 270 is comprised of linear lenses 273 and diffuse (or specular) reflective layer 272 on its bottom. Reflective layer 272 is comprised of an array of stripes that define an array of stripe holes 271 centered and aligned in one direction with the one-dimensional array of linear lenses on the top surface of film 273.

Several raytrace simulations (using the commercial package LucidShape) were carried out by the Inventors using the embodiment of FIG. 27. The base material of the LBEF film was assumed to be PMMA plastic. The hole-fraction parameter, $f_h$, which in this case is the ratio of the slit area 271 divided by the combined areas of the slits 271 and the reflective layer 272, was assumed to be 0.3. The reflectivity of reflective layer 272 was assumed to 0.95.

The pattern produced by the apparatus in the model was wider in the horizontal direction, 48 degrees Full Width Half Max (FWHM) than in the vertical direction, 17 degrees FWHM. It achieved a peak brightness gain of 2.4. This can be compared to the theoretical performance of a traditional BEF film that is based on a linear extrusion of a 45 degree prism.

Assuming the geometry of the BEF film has perfectly sharp tips and notches (which is the best configuration for high performance) the device produces a pattern similar to LBEF in the horizontal direction, 48 degrees FWHM. However, its pattern is elliptical in shape rather than the rectangular pattern of the LBEF apparatus, a disadvantage of the BEF film. Further, the angular width in the vertical direction of the BEF film is considerably larger, 35 degrees FWHM. This results in a lower peak brightness increase of 1.95. The advantages of the LBEF device are more evident if one considers the effect on performance of rounding the tips and notches on the BEF film (versus rounding the notches of the LBEF). 3M reports claims in its literature that in practice its single BEF film increases brightness by a factor of 1.45 to 1.9 depending on the nature of the backlight (wedge versus reflector).

With regard to the relative efficiency of the LBEF single film and the standard BEF film in the simulations, they performed similarly, both having a theoretical efficiency within a beam pattern of 180 degrees full angle in the horizontal direction and 90 degrees full angle in the vertical direction, just over 80%. However, the shape of the LBEF pattern is better suited for some applications that require high peak intensity on axis with the display.

For many of the embodiments described herein, the reflective bottom surface works equally well as a diffuse or specular reflector. One advantage of the using a specular reflector is that the reflective layer can be very thin when compared with a diffuse reflector. Omni-directional specular reflectors are known to those skilled in the art and typically consist of multi-layer dielectric, or multi-layer metallic/dielectric structures. For example, U.S. Pat. No. 6,784,462 describes an omni-directional reflector comprised of a layer of silver and a low refractive index dielectric layer. An example of an all dielectric interference reflector is made by 3M of Minnesota known as product VM2000.

The present embodiments provide new kinds of brightness-enhancing films, having superior efficiency and brightness enhancement. The lensed versions of this design, known as LBEFs, can be applied to the same backlights as conventional retroreflective BEFs (RBEFs), but yielding much higher brightness enhancement. There is also a CPC version, which can be injection molded and reflectively coated. Both collimator versions are mounted over and integral with an opaque diffuse reflector with holes aligned to admit Lambertian radiation upon the entry apertures of the collimator array. Some present embodiments make possible a new kind of backlight, wherein top-mounted light sources shine directly down to prevent hot spots from being seen by the viewer.

While the invention herein disclosed has been described by means of specific embodiments and applications thereof, numerous modifications and variations could be made thereto by those skilled in the art without departing from the scope of the invention set forth in the claims.

What is claimed is:

1. A backlight comprising: a cavity with at least one interior light source and diffusely reflecting wall of high reflectivity; a top surface with multiple intermittently spaced holes allowing exit of light generated by said light sources; and external collimators extending from each of said holes such that the external collimators spatially expand and angularly narrow said light exiting said holes, wherein said collimators are compound parabolic concentrators utilizing reflective profiles matching a shape of said holes and admitting light therefrom.

2. The backlight of claim 1, wherein said collimators are further configured to angularly narrow said light exiting said holes such that the angular narrowing is specified over an angular range from between about 10 degrees to 75 degrees.

3. The backlight of claim 1 wherein said collimators are refractive lenses formed on an upper surface of a thin film wherein said light exiting said holes is admitted through a flat bottom surface of the collimators overlying said holes, thereby forming an internal beam confined to a critical angle of a material of said thin film.

4. The backlight of claim 1 further comprising a side, wherein said light sources are located at the side and light emitted from the light sources is injected into a light guide, said light guide having extraction features that break a guidance, below said light guide there being a reflective bottom surface.

5. The backlight of claim 4 wherein a reflectivity of said reflective bottom surface is specular or diffuse.

6. The backlight of claim 5 wherein the reflectivity of said reflective bottom is at least 95%.

7. The backlight of claim 1 wherein said at least one light source comprises a plurality of light sources that are light emitting diodes mounted on an inside of said top surface between said holes, said light sources directed to shine light inwards away from said holes.

8. The backlight of claim 1 wherein said at least one light source comprises a plurality of light sources that are a combination of phosphor patches mounted on an inside of said top surface between said holes and blue light emitting diodes on a bottom surface positioned opposite the inside of said top surface and shining light upon said phosphor patches.

9. A thin film comprising: a transparent dielectric material bonded to a highly reflective opaque thin film with multiple intermittently spaced holes configured to allow hemispheric light to pass through the holes and to enter said transparent dielectric material, such that said light thereby becoming confined to within a critical angle of said transparent dielectric material; and each of said holes being registered with a lenslet formed on an upper surface of said transparent dielectric material, each said lenslet being configured as an external collimator that receives a portion of the light from said transparent dielectric material and spatially expands and angularly narrows said light confined to said critical angle, wherein at least one of said lenslets comprises an off-axis ellipsoid of revolution and a surrounding truncated cone.

10. The film of claim 9 wherein a profile of said ellipsoid of revolution is horizontal at a lens vertex.

11. The film of claim 9 wherein a profile of said ellipsoid of revolution forms an indentation at the lens vertex and is configured to produce substantially no losses to total internal reflection.

12. A brightness enhancement thin film comprising:
an opaque diffuse reflective thin film with an array of holes,
an overlaying transparent layer of low-index material comprising conicoidal voids with the conicoidal voids being positioned over said holes of said diffuse reflective thin film, and
a layer of high-index material filling said conicoidal voids such that an array of dielectric internally reflecting concentrators is formed thereby.

13. A brightness enhancement thin film comprising:
an opaque diffuse reflective thin film with an array of slits,
an overlaying transparent layer of low-index material comprising linear troughs with the linear troughs being positioned over said slits in said diffuse reflective thin film, and
a layer of high-index material filling said linear troughs such that an array of dielectric internally reflecting concentrators is formed thereby.

14. A brightness enhancement thin film comprising:
an opaque layer of low-index of refraction material having high optical reflectance, with conicoidal voids with an array of holes,
said opaque layer having a bottom surface that is textured and whose remaining surfaces are smooth, and
a layer of high-index of refraction material filling said conicoidal voids such that an array of dielectric internally reflecting concentrators is formed thereby.

15. A brightness enhancement thin film comprising:
an opaque layer of high optical reflectance, with partially spherical voids with an array of holes,
said opaque layer having a bottom surface that is textured and whose remaining surfaces are smooth, and
a top layer comprising spherical lenses filling said partially spherical voids such that an array of lenses is formed thereby.

16. A brightness enhancement film comprising:
a first film comprising a first solid of dielectric with a first reflective layer on a first surface of the solid of dielectric where the reflective layer defines a first array of holes, and the first solid dielectric further comprising a first array of one-directional lenses defining a second surface of the first solid of dielectric opposite the first surface and each of the first array of holes are aligned with one of the first one-directional lenses; and
a second film comprising a second solid of dielectric with a second reflective layer on a first surface of the solid of dielectric where the second reflective layer defines a second array of holes, and the second solid dielectric further comprising a second array of one-directional lenses defining a second surface of the second solid of dielectric opposite the first surface of the second solid dielectric and each of the second array of holes are aligned with one of the second one-directional lenses, with the first surface of the second film adjacent the second surface of the first film and the second film is oriented such that the second array of one-directional lenses is orthogonal to the first array of one-directional lenses.

* * * * *